US009421791B2

(12) United States Patent
Mochizuki

(10) Patent No.: US 9,421,791 B2
(45) Date of Patent: Aug. 23, 2016

(54) PRINTING APPARATUS AND PRINTING SYSTEM

(71) Applicant: Hiroshi Mochizuki, Yamanashi-ken (JP)

(72) Inventor: Hiroshi Mochizuki, Yamanashi-ken (JP)

(73) Assignee: NISCA CORPORATION, Minamikoma-Gun, Yamanashi-Ken (JP)

( * ) Notice: Subject to any disclaimer, the term of this patent is extended or adjusted under 35 U.S.C. 154(b) by 0 days.

(21) Appl. No.: 14/679,439

(22) Filed: Apr. 6, 2015

(65) Prior Publication Data

US 2015/0283801 A1 Oct. 8, 2015

(30) Foreign Application Priority Data

Apr. 8, 2014 (JP) ................................ 2014-079539

(51) Int. Cl.

| | |
|---|---|
| ***B41J 2/325*** | (2006.01) |
| ***G01D 15/10*** | (2006.01) |
| ***G01D 15/16*** | (2006.01) |
| ***B41J 2/005*** | (2006.01) |

(52) U.S. Cl.

CPC ............... *B41J 2/325* (2013.01); *B41J 2/0057* (2013.01)

(58) Field of Classification Search

CPC .. B41J 2/325; B41J 2/0057; B41J 2002/012; B41J 13/12; B41J 11/002; B41J 2202/35; B41J 11/0015

USPC ........ 347/102, 103, 110, 171, 213, 215, 217

See application file for complete search history.

(56) References Cited

U.S. PATENT DOCUMENTS

2008/0079799 A1* 4/2008 Ihara ........................ B41J 2/325 347/213

FOREIGN PATENT DOCUMENTS

JP 2002-355999 A 12/2002
JP 5055917 B2 8/2012

* cited by examiner

*Primary Examiner* — Jannelle M Lebron

(74) *Attorney, Agent, or Firm* — Manabu Kanesaka

(57) ABSTRACT

To provide a printing apparatus for enabling cards high in wear resistance and security properties to be prepared, the printing apparatus is provided with an image formation section and a transfer section, the image formation forms a UV image in an ink reception layer 46*d* of a first region R1 of a transfer film 46, and forms a YMC image in the ink reception layer 46*d* of a second region R2 of the transfer film 46, and the transfer section transfers the ink reception layer 46*d* of the first region R1 with the UV image formed and a protective layer 46*c* of the first region R1 of the transfer film 46 integrally in this order to a card Ca, and transfers the ink reception layer 46*d* of the second region R2 with the YMC image formed and the protective layer 46*c* of the second region R2 integrally in this order thereonto.

13 Claims, 19 Drawing Sheets

PRINTING APPARATUS AND PRINTING SYSTEM

TECHNICAL FIELD

The present invention relates to a printing apparatus and printing system, and more particularly, to a printing apparatus that forms an image on an intermediate transfer medium and that transfers the image to a printing medium, and a printing system provided with the printing apparatus and a host computer.

BACKGROUND ART

Conventionally, such a printing apparatus has been known widely that forms an image such as a photograph of face and character information on a printing medium such as a plastic card. Such a printing apparatus uses an indirect printing scheme for forming an image (mirror image) on a transfer film (intermediate transfer medium) with a thermal head via an ink ribbon, and next transferring the image formed on the transfer film to the printing medium.

In this type of printing apparatus, known is a technique for forming a YMC image in a first region of the transfer film and an invisible image (UV image) visualized by irradiation of a visualization light beam in a second region different from the first region, and transferring onto a card in the order of the YMC image and the invisible image (for example, see Patent Document 1).

Further, also known is another technique for layering a plurality of protective layers on the same surface of the printing medium to improve wear resistance (for example, see Patent Document 2).

PRIOR ART DOCUMENT

Patent Document

[Patent Document 1] Japanese Patent Gazette No. 5055917 (see Claim 1 and FIG. 3)

[Patent Document 2] Japanese Patent Application Publication No. 2002-355999 (see paragraphs [0023] and [0027], and FIG. 7)

DISCLOSURE OF INVENTION

Problems to be Solved by the Invention

In addition, in the invention of Patent Document 1, since the invisible image (UV image) is arranged on the surface side of the card, the invisible image is first lost when wear occurs on the card surface. For example, the invisible image is visualized by applying a visualization light beam such as black light, and therefore, is used mainly in security, and when apart of data constituting the invisible image is lost, there is the risk that a normal judgment on security is impaired. Further, as in the invention of Patent Document 1, when the invisible image is formed with fusible ink, asperities on the card surface are promoted (see FIG. 3) to tend to wear. Furthermore, it is preferable that the invisible image mainly used in security has resistance to forgery and the like.

On the other hand, in the case where the invisible image is arranged on the inner side of the YMC image, the concentration of the invisible image in a portion overlapping the YMC image is changed (thinned) corresponding to the concentration (gray scale of printing data constituting the YMC image) of the YMC image, and when the invisible image overlaps a portion in which the concentration of the YMC image is high, a new problem arises that a concentration difference (concentration fluctuation) occurs in the invisible image invisualizing by applying a visualization light beam.

In view of the above-mentioned matters, it is a first object of the present invention to provide a printing apparatus and printing system for enabling cards high in durability and security properties to be formed, and it is a second object of the invention to provide a printing apparatus and printing system that do not generate concentration fluctuations in an invisible image in applying a visualization light beam.

Means for Solving the Problem

To attain the above-mentioned first object, in a first aspect of the present invention, a printing apparatus that forms an image on an intermediate transfer medium to transfer the image to a printing medium is provided with an image formation section that forms an invisible first image, which is visualized by applying a visualization light beam, in a first region of the intermediate transfer medium and that forms a visible second image with sublimation ink in a second region different from the first region, and a transfer section that transfers the first image formed in the first region to the printing medium and that transfers the second image formed in the second region onto the first image.

In the first aspect, the transfer section transfers the first image formed in the first region to the printing medium and transfers the second image with sublimation ink formed in the second region onto the first image, the surface of the printing medium is thereby almost flat to improve durability, and since the first image is arranged on the inner side of the second image, it is possible to enhance security properties.

In the first aspect, the image formation section may form a third image with fusible ink together in the first region, and the transfer section may transfer the first image and the third image formed in the first region to the printing medium. Further, the intermediate transfer medium has a protective layer and an ink reception layer on a substrate, the image formation section may form a UV image or UR image in the ink reception layer in the first region while forming a YMC image in the ink reception layer in the second region, and the transfer section may transfer the ink reception layer in the first region with the UV image or UR image formed and the protective layer in the first region integrally in this order to the printing medium, while transferring the ink reception layer in the second region with the YMC image formed and the protective layer in the second region integrally in this order thereonto.

Further, in order to attain the above-mentioned second objet, in the first aspect, the apparatus is further provided with a determination section that determines a gray-scale value or printing energy of each of pixels constituting printing data of the first image, corresponding to a gray-scale value of a pixel of printing data of the second image that corresponds to a position overlapping another pixel constituting printing data of the first image, or of the pixel and a peripheral pixel around the pixel, so that a concentration is constant when the first image is visualized by irradiation of the visualization light beam, and the image formation section may form the first image in the first region according to the gray-scale value or printing energy of each of pixels constituting printing data of the first image determined in the determination section. Alternatively, the apparatus is further provided with a determination section that determines a gray-scale value or printing energy of each of pixels constituting printing data of the first image, corresponding to a gray-scale value of a pixel of printing data of the second image that corresponds to a position overlapping another pixel constituting printing data of the first image, or of the pixel and a peripheral pixel around the pixel, the determination section may determine the gray-scale value or printing energy of each of pixels constituting printing data of the first image when the gray-scale value is high in the pixel of printing data of the second image or in the pixel and the peripheral pixel around the pixel to be higher than the gray-scale value or printing energy of each of pixels constituting printing data of the first image when the gray-scale value of the pixel of printing data of the second image or of the pixel and the peripheral pixel around the pixel is lower than a predetermined gray-scale value, and the image formation section may form the first image in the first region according to the gray-scale value or printing energy of each of pixels constituting printing data of the first image determined in the determination section.

At this point, the determination section may determine a gray-scale value or printing energy of each of pixels constituting printing data of the first image, corresponding to gray-scale values of respective pixels of a plurality of items of printing data of the second image that corresponds to a position overlapping a pixel constituting printing data of the first image, or gray-scale values of respective pixels of a plurality of items of printing data of the second image that corresponds to the overlapping position and gray-scale values of peripheral pixels around respective pixels of a plurality of items of printing data, so that a concentration is constant when the first image is visualized by irradiation of the visualization light beam. Further, the determination section may determine a gray-scale value of pixels constituting printing data of the first image to be larger than a gray-scale value of pixels constituting printing data of the first image that is an original.

Further, in order to attain the first and second objects, a second aspect of the present invention is a printing system provided with the printing apparatus of the first aspect and a host computer, and is characterized in that one of the printing apparatus and the host computer is provided with a determination section that determines a gray-scale value or printing energy of each of pixels constituting printing data of the first image, corresponding to a gray-scale value of a pixel of printing data of the second image that corresponds to a position overlapping another pixel constituting printing data of the first image, or of the pixel and a peripheral pixel around the pixel so that a concentration is constant when the first image is visualized by irradiation of the visualization light beam, and that the image formation section forms the first image in the first region according to the gray-scale value or printing energy of each of pixels constituting printing data of the first image determined in the determination section.

In the second aspect, one of the printing apparatus and the host computer may be further provided with a correction section that corrects printing data of the first image based on a gray-scale value of each of pixels constituting printing data of the first image determined in the determination section, so that the image formation section forms the first image in the first region according to a gray-scale value of each of pixels constituting printing data of the first image corrected in the correction section.

Advantageous Effect of the Invention

According to the present invention, since the transfer section transfers the first image formed in the first region to the printing medium and transfers the second image with sublimation ink formed in the second region onto the first image, it is possible to obtain the effects that the surface of the printing medium is almost flat to improve durability, and that since the first image is arranged on the inner side of the second image, it is possible to enhance security properties.

BRIEF DESCRIPTION OF DRAWINGS

FIG. 13A illustrates the relationship between a first region and a second region of an ink ribbon and transfer film in an image formation section, and FIG. 13B shows a state in which the first region and second region of the transfer film are transferred to the card in a transfer section;

FIG. 14A illustrates the transfer film in the first region or the second region, and FIG. 14B illustrates an ink reception layer and protective layer peeled off from the transfer film in the transfer section;

FIG. 15A illustrates a desired layout, FIG. 15B illustrates a layout of the UV image and Bk image, and FIG. 15C illustrates a layout of the YMC image;

FIG. 18A illustrates the relationship between UV printing energy and UV coloring, FIG. 18B illustrates the relationship of a concentration of the UV image with a gray-scale value of a pixel of the YMC printing data in applying an invisible light beam when a pixel of the UV printing data overlaps a pixel of the YMC printing data, and FIG. 18C illustrates the relationship of an energy correction amount of the pixel of the UV printing data with the gray-scale value of the YMC printing data when the pixel of the UV printing data overlaps the pixel of the YMC printing data.

BEST MODE FOR CARRYING OUT THE INVENTION

With reference to drawings, described below is an Embodiment in which the present invention is applied to a printing apparatus for printing and recording text and image on a card, while performing magnetic or electric information recording on the card.

<System Configuration>

Figure 1:
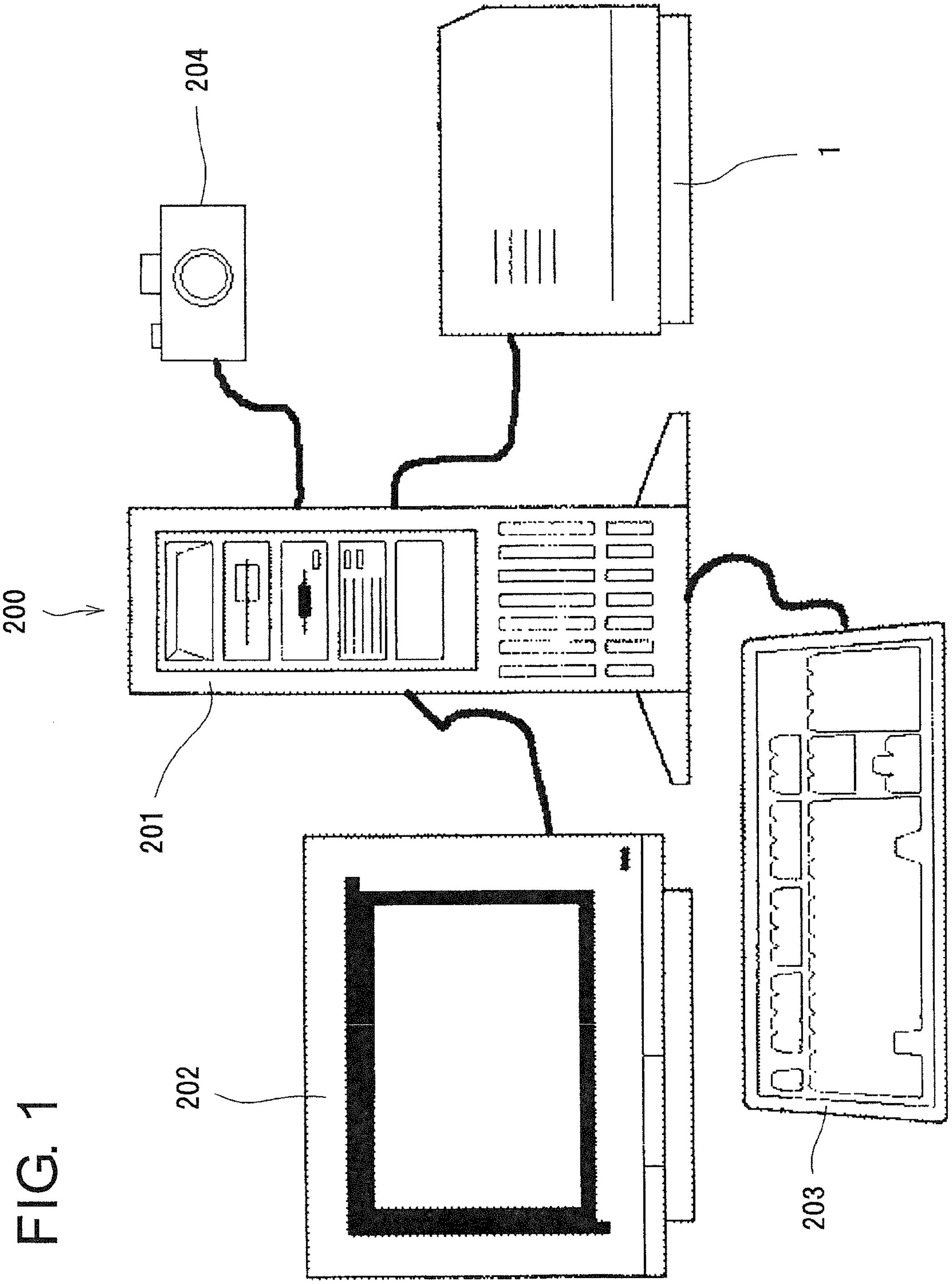
FIG. 1 is an outside view of a printing system including a printing apparatus of an Embodiment to which the present invention is applicable.
Figure 12:
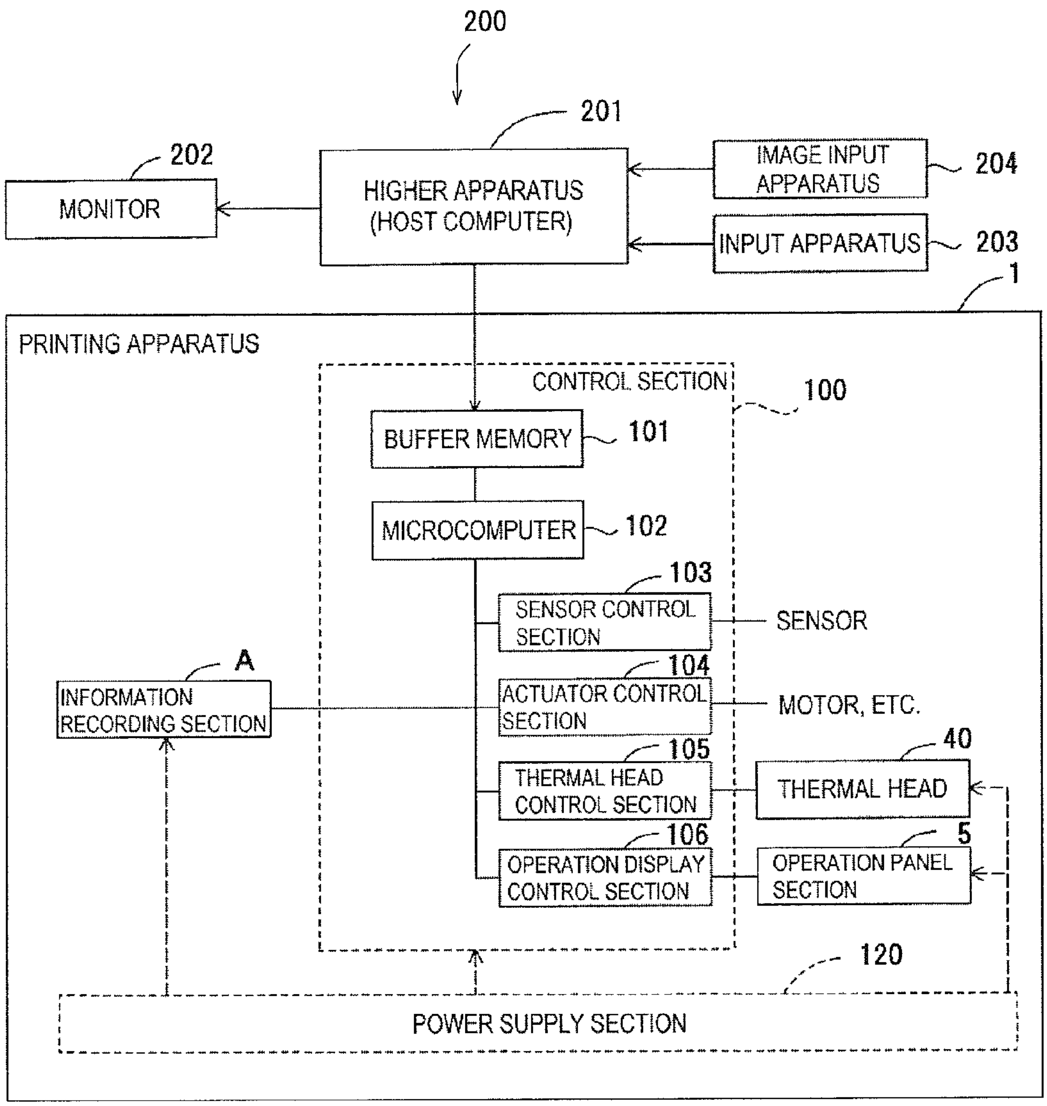
FIG. 12 is a block diagram illustrating a schematic configuration of a control section in the printing apparatus of the Embodiment.

As shown in FIGS. 1 and 12, a printing apparatus 1 of this Embodiment constitutes a part of a printing system 200. In other words, the printing system 200 is broadly comprised of a higher apparatus 201 (for example, host computer such as a personal computer), and the printing apparatus 1.

The printing apparatus 1 is connected to the higher apparatus 201 via an interface with the figure omitted, and the higher apparatus 201 is capable of transmitting image data, magnetic or electric recording data and the like to the printing apparatus 1 to indicate recording operation and the like. In addition, the printing apparatus 1 has an operation panel section (operation display section) 5 (see FIG. 12), and as well as recording operation indication from the higher apparatus 201, recording operation is also capable of being indicated from the operation panel section 5.

The higher apparatus 201 is connected to an image input apparatus 204 such as a digital camera and scanner, an input apparatus 203 such as a keyboard and mouse to input commands and data to the higher apparatus 201, and a monitor 202 such as a liquid crystal display to display data and the like generated in the higher apparatus 201.

<Printing Apparatus>

Figure 2:
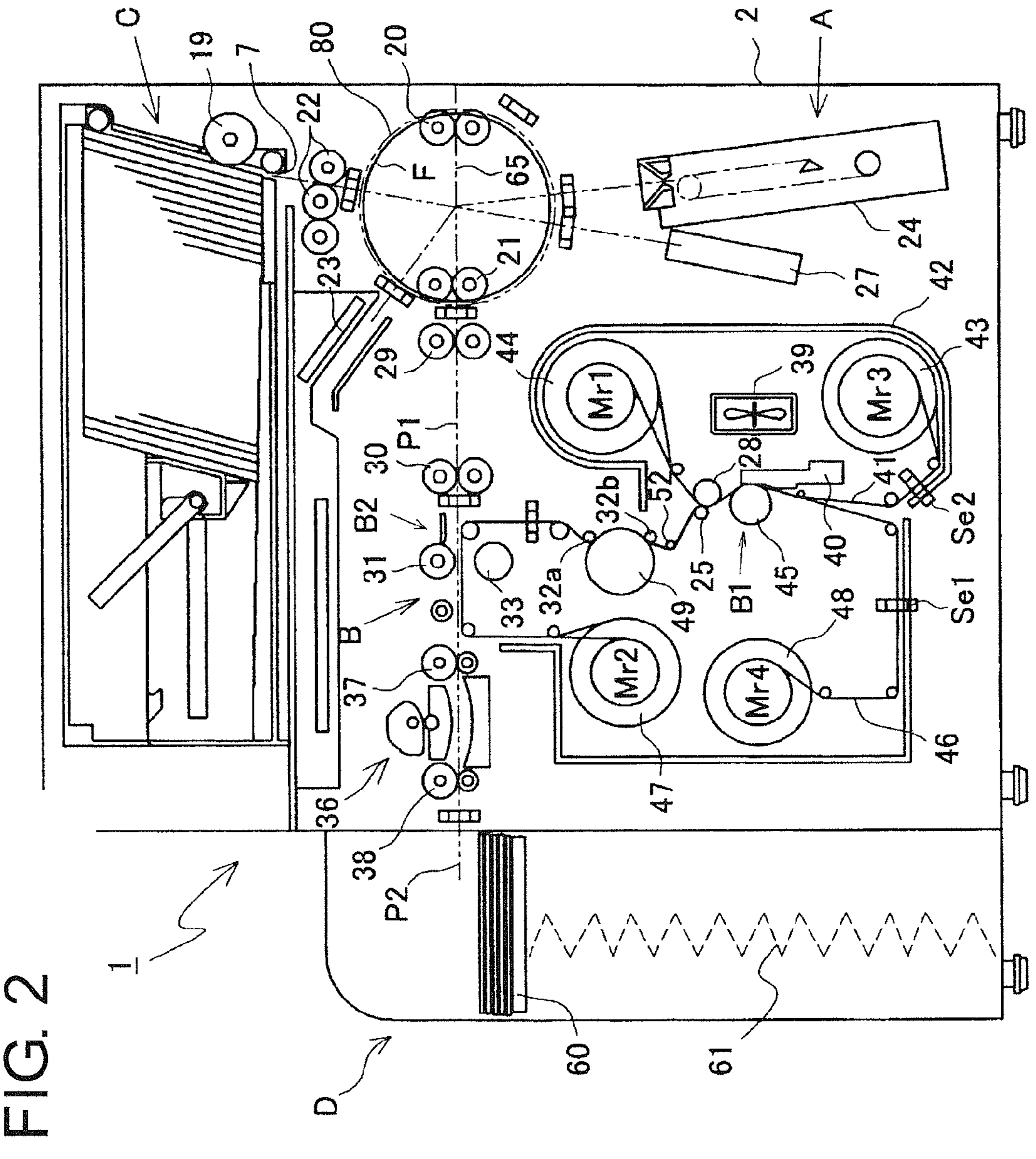
FIG. 2 is a schematic configuration view of the printing apparatus of the Embodiment.

As shown in FIG. 2, the printing apparatus 1 has a housing 2, and in the housing 2 are provided an information recording section A, printing section B, media storage section C, storage section D and rotating unit F.

(Information Recording Section)

The information recording section A is comprised of a magnetic recording section 24, non-contact type IC recording section 23, and contact type IC recording section 27.

(Media Storage Section)

The media storage section C aligns and stores a plurality of cards in a standing posture, is provided at its front end with a separation opening 7, and feeds and supplies sequentially starting with the card in the front row with a pickup roller 19.

(Rotating Unit)

The fed blank card Ca (see FIG. 13B) is first sent to a reverse unit F with carry-in rollers 22. The reverse unit F is comprised of a rotating frame 80 bearing-supported by the housing 2 to be turnable, and two roller pairs 20, 21 supported on the frame. Then, the roller pairs 20, 21 are axially supported by the rotating frame 80 to be rotatable.

In the outer region of the rotating reverse unit F are disposed the above-mentioned magnetic recording section 24, non-contact type IC recording section 23, and contact type IC recording section 27. Then, the roller pairs 20, 21 form a medium transport path 65 for transporting the card Ca toward one of the information recording sections 23, 24 and 27, and data is magnetically or electrically written on the card Ca in the recording sections.

(Printing Section)

The printing section B is to form an image such as a photograph of face and text data on the frontside and backside of the card Ca, and a medium transport path P1 for carrying the card Ca is provided on an extension of the medium transport path 65. Further, in the medium transport path P1 are disposed transport rollers 29, 30 that transport the card Ca, and the rollers are coupled to a transport motor not shown.

The printing section B has a film-shaped medium transport mechanism, and is provided with an image formation section B1 that forms an image, with a thermal head 40, on a transfer film 46 transported with the transport mechanism, and a transfer section B2 that subsequently transfers the image formed on the transfer film 46 to the surface of the card Ca on the medium transport path P1 with a heat roller 33.

On the downstream side of the printing section B is provided a medium transport path P2 for carrying the printed card Ca to a storage stacker 60. In the medium transport path P2 are disposed transport rollers 37, 38 that transport the card Ca, and the rollers are coupled to a transport motor not shown.

A decurl mechanism 36 is disposed in between the transport roller 37 and the transport roller 38, presses the card center portion held between the transport rollers 37, 38, and thereby corrects curl generated by thermal transfer with the heat roller 33. Therefore, the decurl mechanism 36 is configured to be able to shift to positions in the vertical direction as viewed in FIG. 2 by an up-and-down mechanism including a cam not shown.

(Storage Section)

The storage section D is configured to store cards Ca sent from the printing section B in the storage stacker 60. The storage stacker 60 is configured to shift downward in FIG. 2 with an up-and-down mechanism 61.

(Details of the Printing Section)

Next, the printing section B in the entire configuration of the above-mentioned printing apparatus 1 will be further described specifically.

Figure 13A:
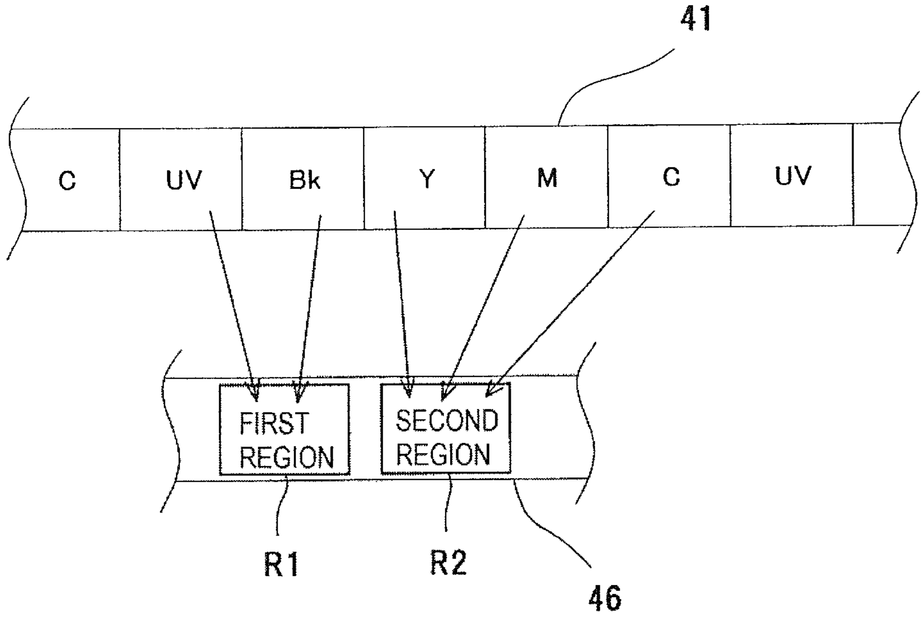
FIGS. 13A and 13B contain explanatory views schematically illustrating the relationship among an ink ribbon, transfer film and card, where
Figure 14A:
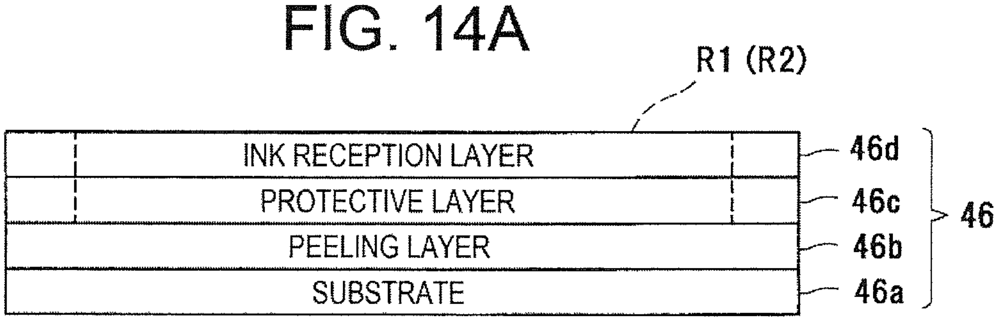
FIGS. 14A and 14B contain explanatory views schematically illustrating the cross section of the transfer film, where

As shown in FIG. 13A, the transfer film 46 has the shape of a band having a width slightly larger than the width direction of the card Ca, is, as shown in FIG. 14A, comprised of four layers, and is formed by layering, from above, an ink reception layer 46*d* that receives ink of an ink ribbon 41, a transparent protective layer 46*c* that protects the surface of the ink reception layer 46*d*, a peeling layer 46*b* to promote integral peeling of the ink reception layer 46*d* and protective layer 46*c* by heat, and a substrate (base film) 46*a* in this order.

As shown in FIG. 2, the transfer film 46 is wound up or fed by a wind-up roll 47 or feed roll 48 that rotates inside a transfer film cassette by driving of motor Mr2 or M4, respectively. In other words, in the transfer film cassette, a wind-up spool is disposed in the center of the wind-up roll 47, a feed spool is disposed in the center of the feed roll 48, a rotation drive force of the motor Mr2 is transferred to the wind-up spool via a gear not shown, and a rotation derive force of the motor Mr4 is transferred to the feed spool via a gear not shown. A film transport roller 49 is a main drive roller to carry the transfer film 46, and by controlling drive of the roller 49, transport amount and transport halt position of the transfer film 46 are determined. The film transport roller 49 is coupled to a stepping motor not shown. The motors Mr2 and Mr4 are also driven in driving the film transport roller 49, are to wind the transfer film 46 fed from one of the wind-up roll 47 and feed roll 48 by the other one, and are not driven as main transport of the transfer film 46.

Pinch rollers 32*a* and 32*b* are disposed on the periphery of the film transport roller 49. Although not shown in FIG. 2, the pinch rollers 32*a* and 32*b* are configured to be movable to move and retract with respect to the film transport roller 49, and in a state in the figure, the rollers move to the film transport roller 49 to come into press-contact, and thereby wind the transfer film 46 around the film transport roller 49. By this means, the transfer film 46 undergoes accurate transport by a distance corresponding to the number of revolutions of the film transport roller 49.

The ink ribbon 41 is stored in an ink ribbon cassette 42, a supply spool 43 for supplying the ink ribbon 41 and wind-up spool 44 for winding up the ink ribbon 41 are stored in the cassette 42, the wind-up spool 44 rotates by a drive force of a motor Mr1, and the supply spool 43 rotates by a drive force of a motor Mr3. Forward-backward rotatable DC motors are used for the motors Mn1 and Mr3. Further, "Se2" shown in FIG. 2 denotes a transmission sensor to detect an empty mark indicative of a use limit of the ink ribbon 41 attached to the end portion of the ink ribbon 41.

As shown in FIG. 13A, the ink ribbon 41 exhibits the shape of a band obtained by repeating ink of UV (ultraviolet), Bk (Black), Y (Yellow), M (Magenta), and C (Cyan) in a face sequential manner with a width slightly larger than the length in the longitudinal direction of the card Ca on the film. Thermofusible ink (fusible ink) is used in the ink of Bk, and thermal sublimation ink (sublimation ink) is used in the ink of UV, Y, M and C. In addition, the UV ink is ink visualized by irradiation of a visualization light beam, and as an invisible (colorless) fluorescent material, uses pigments containing crystals of metal oxide, metal sulfide and the like as a main component, and organic compounds (for example, publicly-known fluorescent brightening agents of stilbene system, diamino diphenyl system, oxazole system, imidazole system, thiazole system, coumarin system, naphthalimide system, thiophene system and the like).

As shown in FIG. 2, a platen roller 45 and thermal head 40 form the image formation section B1, and the thermal head 40 is disposed in a position opposed to the platen roller 45. The thermal head 40 has a plurality of heating elements lined in the main scanning direction, these heating elements are selectively heated and controlled by a head control IC (not shown) according to printing data, and an image is printed on the transfer film 46 via the ink ribbon 41. In addition, a cooling fan 39 is to cool the thermal head 40.

The ink ribbon 41 with which printing on the transfer film 46 is finished is peeled off from the transfer film 46 with a peeling roller 25 and peeling member 28. The peeling member 28 is fixed to the ink ribbon cassette 42, the peeling roller 25 comes into contact with the peeling member 28 in printing, and the roller 25 and member 28 nip the transfer film 46 and ink ribbon 41 to peel. Then, the peeled ink ribbon 41 is wound around the wind-up spool 44 by the drive force of the motor Mr1, and the transfer film 46 is transported to the transfer section B2 having the platen roller 31 and heat roller 33 by the film transport roller 49.

In the transfer section B2, the transfer film 46 is nipped together with the card Ca by the heat roller 33 and platen roller 31, and the image on the transfer film 46 is transferred to the card surface. In addition, the heat roller 33 is attached to an up-and-down mechanism (not shown) so as to come into contact with and separate from the platen roller 31 via the transfer film 46.

Figure 3:
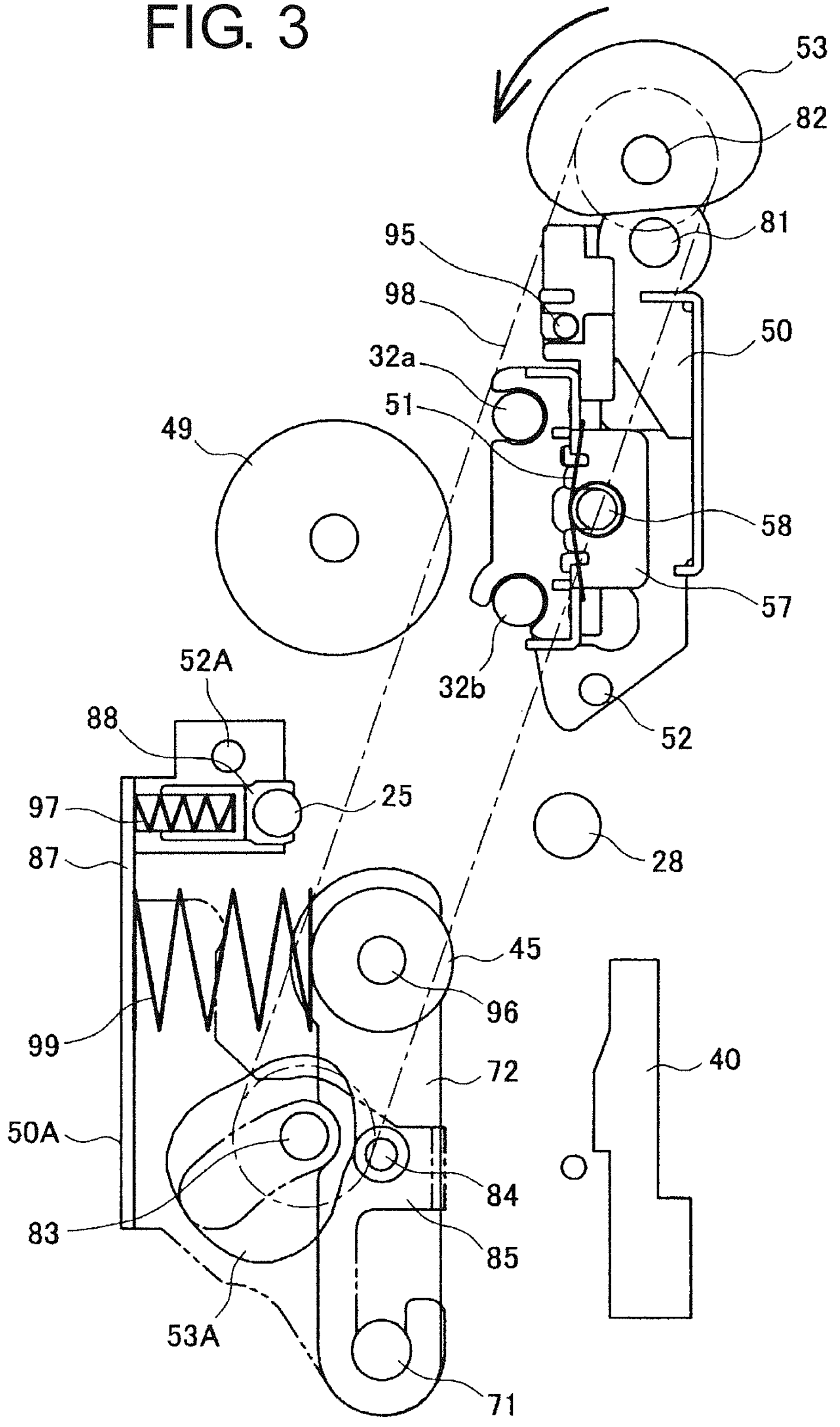
FIG. 3 is an explanatory view of a control state by a cam in a waiting position in which pinch rollers and film transport roller are separated from each other, and a platen roller and thermal head are separated from each other.
Figure 4:
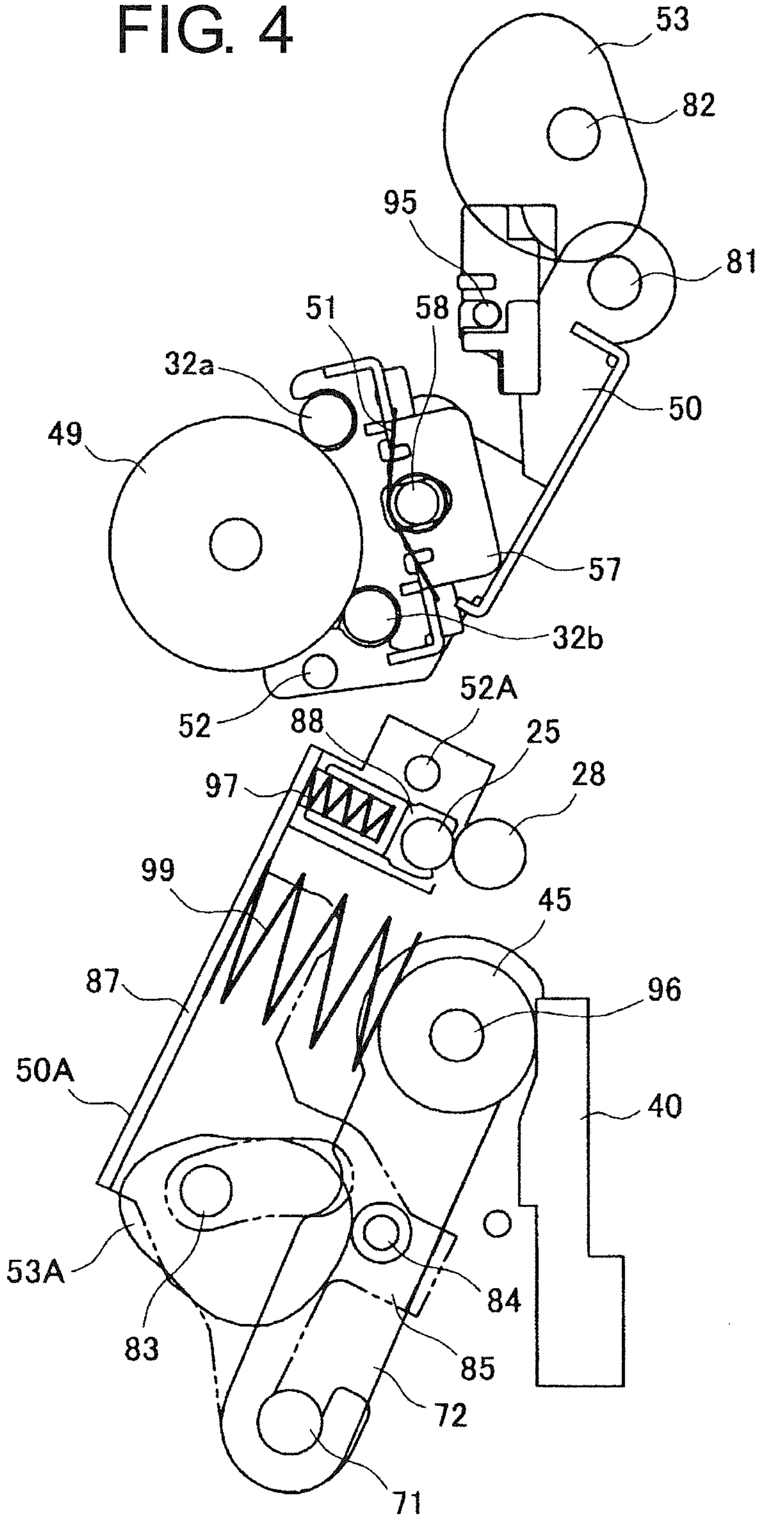
FIG. 4 is an explanatory view of a control state by the cam in a printing position in which the pinch rollers and film transport roller are brought into contact with each other, and the platen roller and thermal head are brought into contact with each other.
Figure 5:
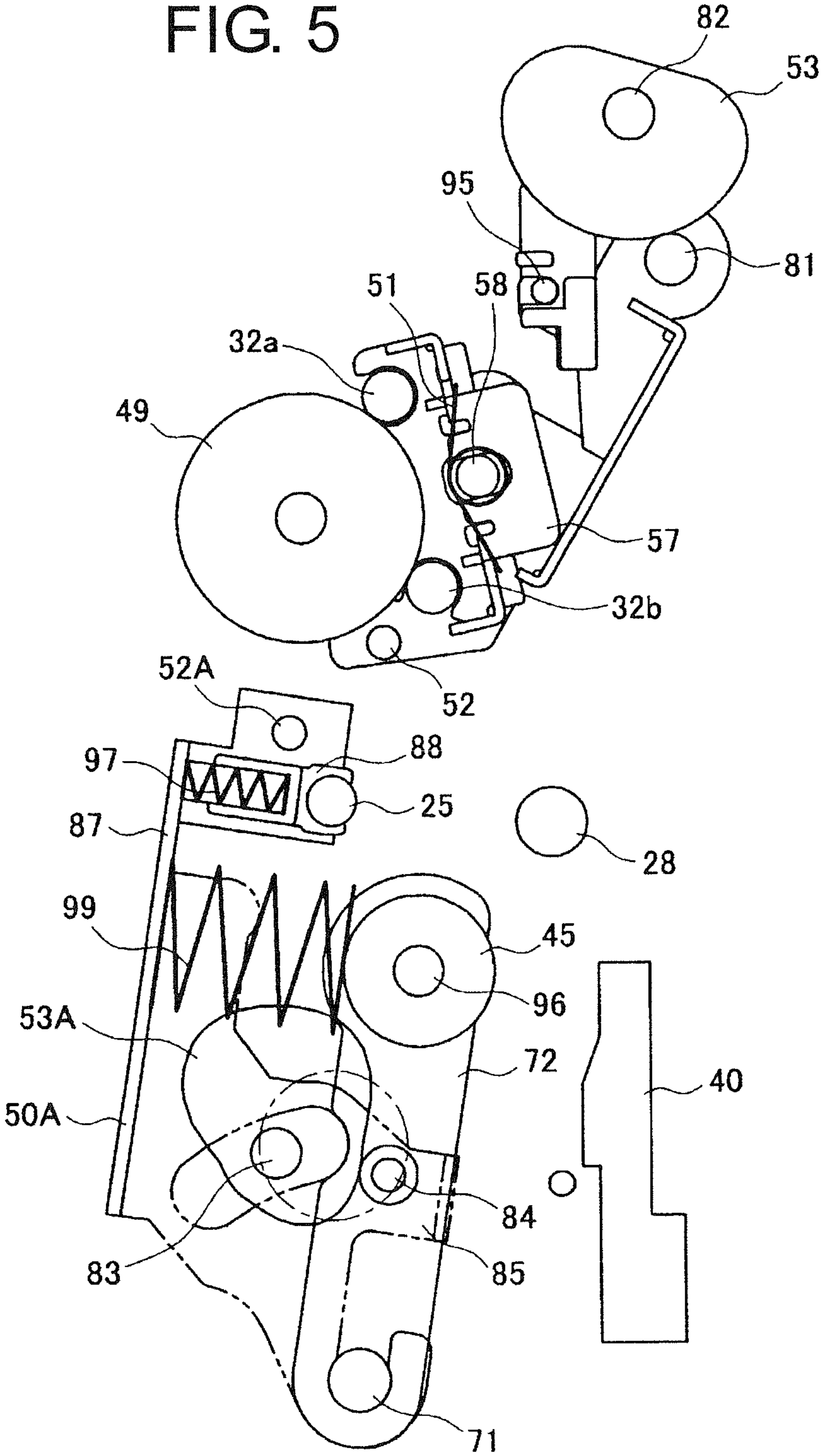
FIG. 5 is an explanatory view of a control state by the cam in a transport position in which the pinch rollers and film transport roller are brought into contact with each other, and the platen roller and thermal head are brought into contact with each other.
Figure 10:
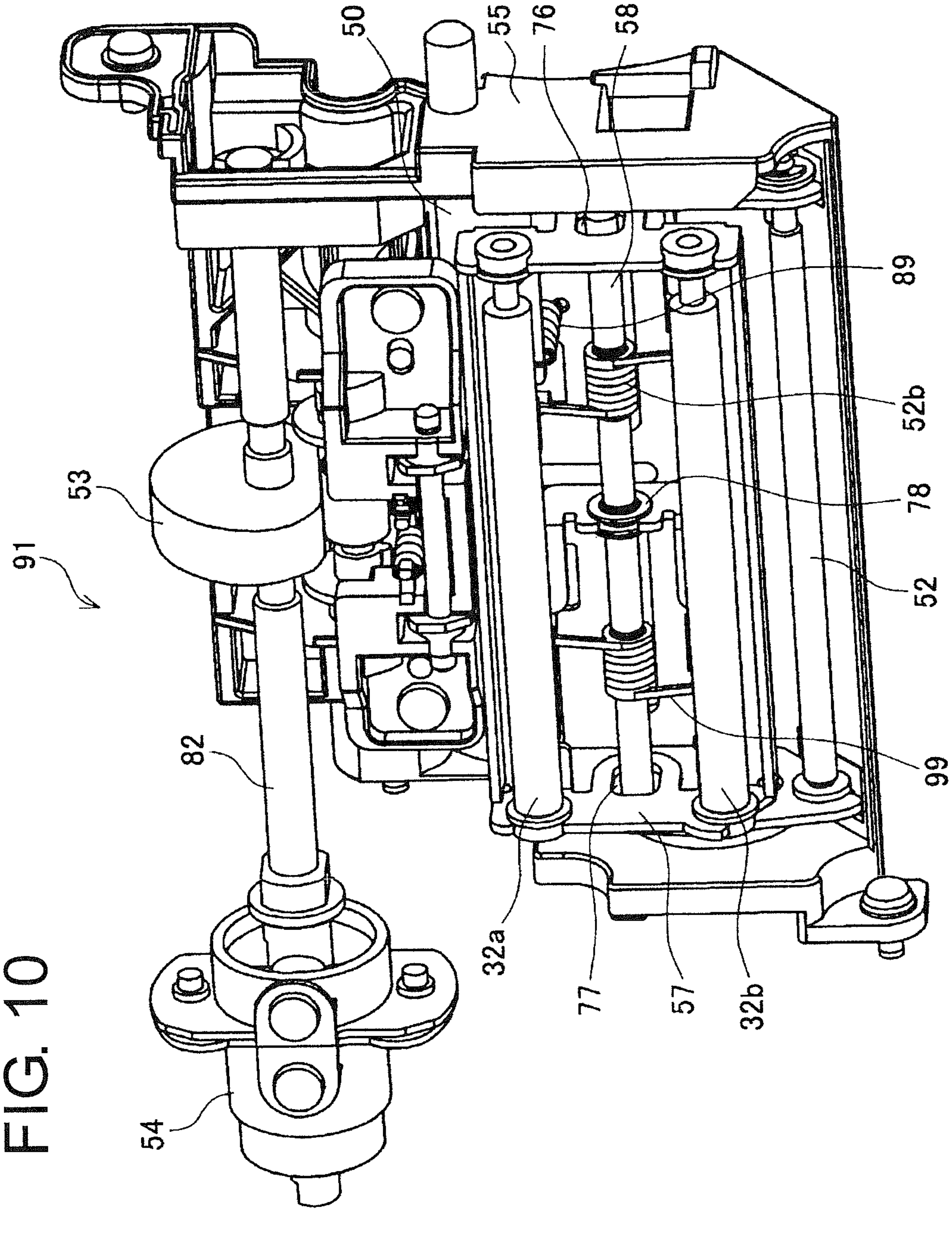
FIG. 10 is an outside view showing a configuration of a second unit integrated to incorporate the pinch rollers and their peripheral parts into the printing apparatus.

The configuration of the image formation section B1 will specifically be described further together with its action. As shown in FIGS. 3 to 5, the pinch rollers 32*a*, 32*b* are respectively supported by an upper end portion and lower end portion of a pinch roller support member 57, and the pinch roller support member 57 is supported rotatably by a support shaft 58 penetrating the center portion of the member 57. As shown in FIG. 10, the support shaft 58 is laid at its opposite end portions between long holes 76, 77 formed in the pinch roller support member 57, and is at its center portion fixed to a fix portion 78 of a bracket 50. Further, the long holes 76, 77 are provided with spaces in the horizontal direction and vertical direction with respect to the support shaft 58. By this means, it is made possible to adjust the pinch rollers 32*a*, 32*b* with respect to the film transport roller 49, described later.

Spring members 51 (51*a*, 51*b*) are mounted on the support shaft 58, and end portions on which the pinch rollers 32*a*, 32*b* are installed of the pinch roller support member 57 respectively contact the spring members 51, and are biased to the direction of the film transport roller 49 by the spring forces.

The bracket 50 comes into contact with the cam operation surface of a cam 53 in a cam receiver 81, and is configured to shift in the horizontal direction viewed in the figure with respect to the film transport roller 49, corresponding to rotation in the arrow direction of the cam 53 with a cam shaft 82 as the axis rotating by a drive force of a drive motor 54 (see FIG. 10). Accordingly, when the bracket 50 moves toward the film transport roller 49 (FIGS. 4 and 5), the pinch rollers 32*a*, 32*b* come into press-contact with the film transport roller 49 against the spring members 51 with the transfer film 46 nipped, and wind the transfer film 46 around the film transport roller 49.

At this point, the pinch roller 32*b* in a farther position from a shaft 95 as a rotation axis of the bracket 50 first comes into press-contact with the film transport roller 49, and next, the pinch roller 32*a* comes into press-contact. In this way, by arranging the shaft 95 that is the rotation axis higher than the film transport roller 49, the pinch roller support member 57 comes into contact with the film transport roller 49 while rotating, instead of parallel shift, and there is the advantage that the space in the width direction is less than in the parallel shift.

Further, the press-contact forces when the pinch rollers 32*a*, 32*b* come into press-contact with the film transport roller 49 are uniform in the width direction of the transfer film 46 by the spring members 51. At this point, since the long holes 76, 77 are formed on the opposite sides of the pinch roller support member 57 and the support shaft 58 is fixed to the fix portion 78, it is possible to adjust the pinch roller support member 57 in three directions, and the transfer film 46 is transported in a correct posture by rotation of the film transport roller 49 without causing skew. In addition, adjustments in three directions described herein are to (i)

adjust the parallel degree in the horizontal direction of the shafts of the pinch rollers 32*a*, 32*b* with respect to the shaft of the film transport roller 49 to uniform the press-contact forces in the shaft direction of the pinch rollers 32*a*, 32*b* with respect to the film transport roller 49, (ii) adjust shift distances of the pinch rollers 32*a*, 32*b* with respect to the film transport roller 49 to uniform the press-contact force of the pinch roller 32*a* on the film transport roller 49 and the press-contact force of the pinch roller 32*b* on the film transport roller 49, and (iii) adjust the parallel degree in the vertical direction of the shafts of the pinch rollers 32*a*, 32*b* with respect to the shaft of the film transport roller 49 so that the shafts of the pinch rollers 32*a*, 32*b* are perpendicular to the film travel direction.

Furthermore, the bracket 50 is provided with a tension receiving member 52 that comes into contact with a portion of the transfer film 46 which is not wound around the film transport roller 49 when the bracket 50 moves toward the film transport roller 49.

The tension receiving member 52 is provided to prevent the pinch rollers 32*a*, 32*b* from retracting from the film transport roller 49 respectively against the biasing forces of the spring members 51 due to the tension of the transfer film 46 occurring when the pinch rollers 32*a*, 32*b* bring the transfer film 46 into press-contact with the film transport roller 49. Accordingly, the tension receiving member 52 is attached to the front end of the end portion on the rotation side of the bracket 50 so as to come into contact with the transfer film 46 in the position to the left of the pinch rollers 32*a*, 32*b* viewed in the figure. FIG. 2 shows a state in which the tension receiving member 52 is brought into contact with the transfer film 46.

By this means, the cam 53 is capable of directly receiving the tension occurring due to elasticity of the transfer film 46 through the tension receiving member 52. Accordingly, the pinch rollers 32*a*, 32*b* are prevented from retracting from the film transport roller 49 due to the tension and from decreasing the press-contact forces of the pinch rollers 32*a*, 32*b*, thereby maintain the winding state in which the transfer film 46 is brought into intimate contact with the film transport roller 49, and are able to perform accurate transport.

Figure 9:
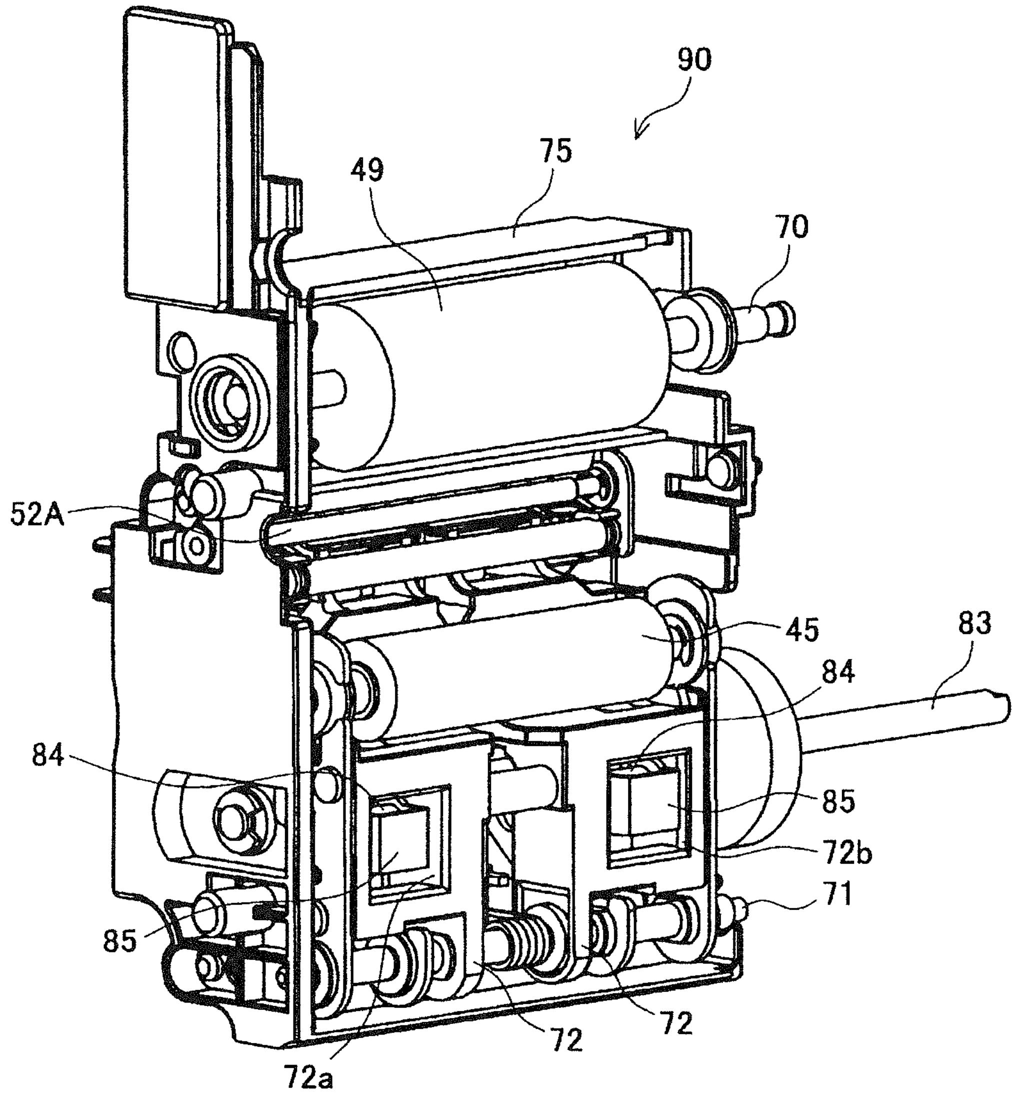
FIG. 9 is an outside view showing a configuration of a first unit integrated to incorporate the film transport roller, platen roller and their peripheral parts into the printing apparatus.

As shown in FIG. 9, the platen roller 45 disposed along the transverse width direction of the transfer film 46 is supported by a pair of platen support members 72 rotatable on a shaft 71 as the axis. The pair of platen support members 72 support opposite ends of the platen roller 45. The platen support members 72 are respectively connected to end portions of a bracket 50A having the shaft 71 as a common rotating shaft via spring members 99.

The bracket 50A has a substrate 87, and cam receiver support portion 85 formed by bending the substrate 87 in the direction of the platen support member 72, and the cam receiver support portion 85 holds a cam receiver 84. A cam 53A rotating on a cam shaft 83 as the axis driven by the drive motor 54 is disposed between the substrate 87 and the cam receiver support portion 85, and is configured so that the cam operation surface and cam receiver 84 come into contact with each other. Accordingly, when the bracket 50A moves in the direction of the thermal head 40 by rotation of the cam 53A, the platen support members 72 also shift to bring the platen roller 45 into press-contact with the thermal head 40.

The spring members 99 and cam 53A are thus disposed vertically between the bracket 50A and platen support members 72, and it is thereby possible to store a platen shift unit within the distance between the bracket 50A and platen support members 72. Further, the width direction is held within the width of the platen roller 45, and it is possible to save space.

Moreover, since the cam receiver support portion 85 is fitted into bore portions 72*a*, 72*b* (see FIG. 9) formed in the platen support members 72, even when the cam receiver support portion 85 is formed while protruding in the direction of the platen support members 72, the distance between the bracket 50A and the platen support members 72 is not increased, and also in this respect, it is possible to save space.

When the platen roller 45 comes into press-contact with the thermal head 40, the spring members 99 connected to respective platen support members 72 act each so as to uniform the press-contact force on the width direction of the transfer film 46. Therefore, when the transfer film 46 is transported by the film transport roller 49, the skew is prevented, and it is possible to perform image formation on the transfer film 46 by the thermal head 40 accurately without the printing region of the transfer film 46 shifting in the width direction.

The substrate 87 of the bracket 50A is provided with a pair of peeling roller support members 88 for supporting opposite ends of the peeling roller 25 via spring members 97, and when the bracket 50A moves to the thermal head 40 by rotation of the cam 53A, the peeling roller 25 comes into contact with the peeling member 28 to peel off the transfer film 46 and ink ribbon 41 nipped between the roller and member. The peeling roller support members 88 are also provided respectively at opposite ends of the peeling roller 25 as in the platen support members 72, and are configured so as to uniform the press-contact force in the width direction on the peeling member 28.

A tension receiving member 52A is provided in an end portion on the side opposite to the end portion on the shaft support 59 side of the bracket 50A. The tension receiving member 52A is provided to absorb the tension of the transfer film 46 occurring in bringing the platen roller 45 and peeling roller 25 respectively into press-contact with the thermal head 40 and peeling member 28. The spring members 99 and 97 are provided so as to uniform the press-contact force on the width direction of the transfer film 46, and in order for the spring members 99 and 97 not to be inversely behind the tension of the transfer film 46 and decrease the press-contact force on the transfer film 46, the tension receiving member 52A receives the tension from the transfer film 46. In addition, since the tension receiving member 52A is also fixed to the bracket 50A as in the above-mentioned tension receiving member 52, the cam 53A receives the tension of the transfer film 46 via the bracket 50A, and is not behind the tension of the transfer film 46. By this means, the press-contact force of the thermal head 40 and platen roller 45 and the press-contact force of the peeling member 28 and peeling roller 25 are held, and it is thereby possible to perform excellent printing and peeling. Further, any error does not occur in the transport amount of the transfer film 46 in driving the film transport roller 49, the transfer film 46 corresponding to the length of the printing region is accurately transported to the thermal head 40, and it is possible to perform printing with accuracy.

The cam 53 and cam 53A are driven by same drive motor 54 with a belt 98 (see FIG. 3) laid therebetween.

Figure 6:
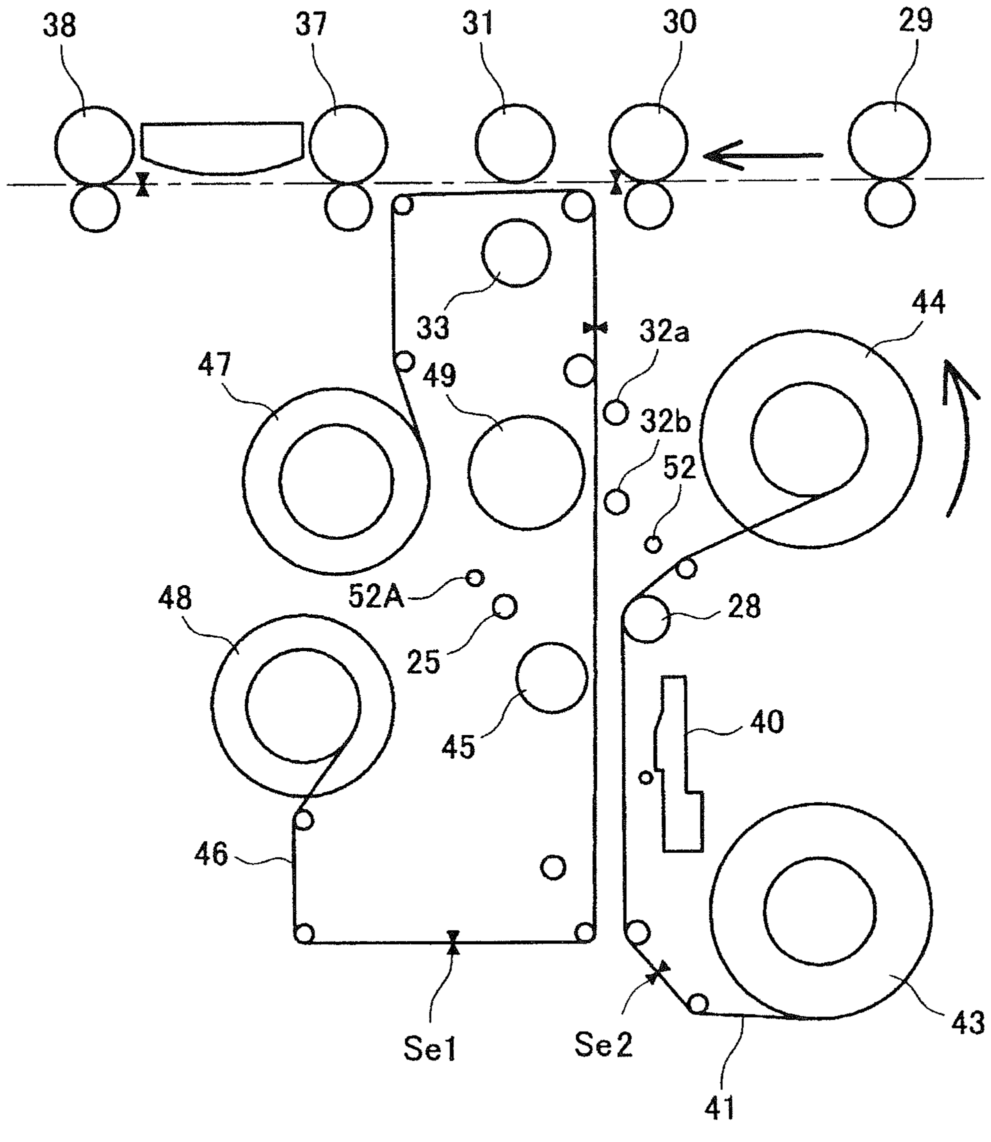
FIG. 6 is an operation explanatory view to explain the state of the waiting position in the printing apparatus.

When the printing section B is in a waiting position as shown in FIG. 6, the cam 53 and cam 53A are in the state as shown in FIG. 3, the pinch rollers 32*a*, 32*b* are not brought into press-contact with the film transport roller 49, and the platen roller 45 is not brought into press-contact with the thermal head 40 either. In other words, in the waiting position, the platen roller 45 and thermal head 40 are positioned in separate positions in which the roller 45 and head 40 are separate.

Figure 7:
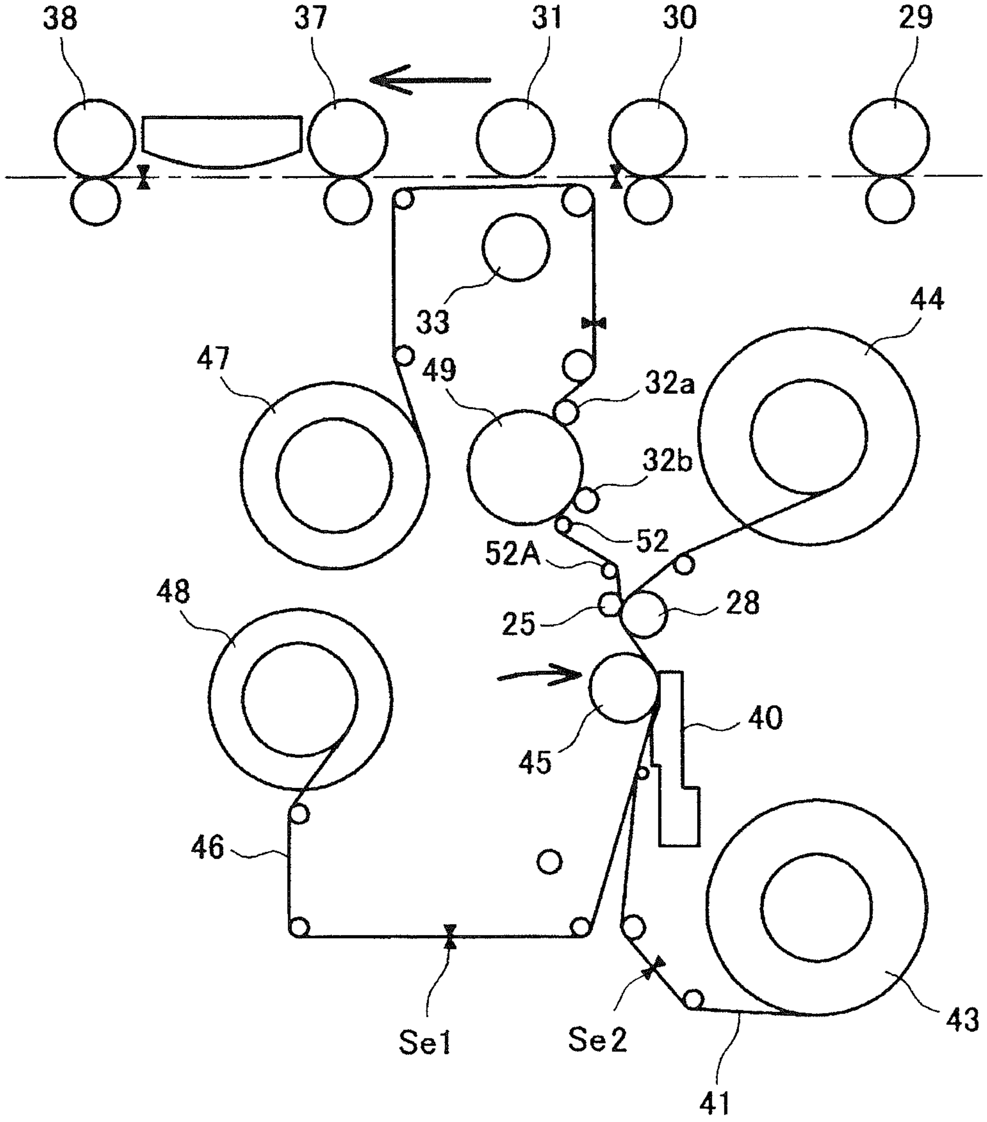
FIG. 7 is an operation explanatory view to explain the state of the transport position in the printing apparatus.

Then, when the cam 53 and cam 53A are rotated in conjunction with each other and are in the state as shown in FIG. 4, the printing section B shifts to a printing position as shown in FIG. 7. At this point, the pinch rollers 32*a*, 32*b* first wind the transfer film 46 around the film transport roller 49, and concurrently, the tension receiving member 52 comes into contact with the transfer film 46. Subsequently, the platen roller 45 comes into press-contact with the thermal head 40. In this printing position, the platen roller 45 shifts toward the thermal head 40 to nip the transfer film 46 and ink ribbon 41 and come into press-contact, and the peeling roller 25 is in contact with the peeling member 28.

In this state, when transport of the transfer film 46 is started by rotation of the film transport roller 49, at the same time, the ink ribbon 41 is also wound around the wind-up spool 44 by operation of the motor Mn1 and transported in the same direction. During this transport, a positioning mark provided in the transfer film 46 passes through a sensor Se1 and shifts a predetermined amount, and at the time the transfer film 46 arrives at a printing start position, printing by the thermal head 40 is performed on the predetermined region of the transfer film 46. Particularly, since the tension of the transfer film 46 is large during printing, the tension of the transfer film 46 acts on the direction for separating the pinch rollers 32*a*, 32*b* from the film transport roller 49 and the direction for separating the peeling roller 25 and platen roller 45 from the peeling member 28 and thermal head 40. However, as described above, since the tension of the transfer film 46 is received in the tension receiving members 52, 52A, the press-contact forces of the pinch rollers 32*a*, 32*b* are not decreased, it is thereby possible to perform accurate film transport, the press-contact force of the thermal head 40 and platen roller 45 and the press-contract force of the peeling member 28 and peeling roller 25 are not decreased either, and it is thereby possible to perform accurate printing and peeling. The ink ribbon 41 with which printing is finished is peeled off from the transfer film 46 and wound around the wind-up spool 44.

A shift amount by transport of the transfer film 46 i.e. a length in the transport direction of a printing region to undergo printing is detected by an encoder (not shown) provided in the film transport roller 49, rotation of the film transport roller 49 is halted corresponding to detection, and at the same time, winding by the wind-up spool 44 by operation of the motor Mr1 is also halted. By this means, finished is printing with the ink of the first ink panel on the printing region of the transfer film 46.

Figure 8:
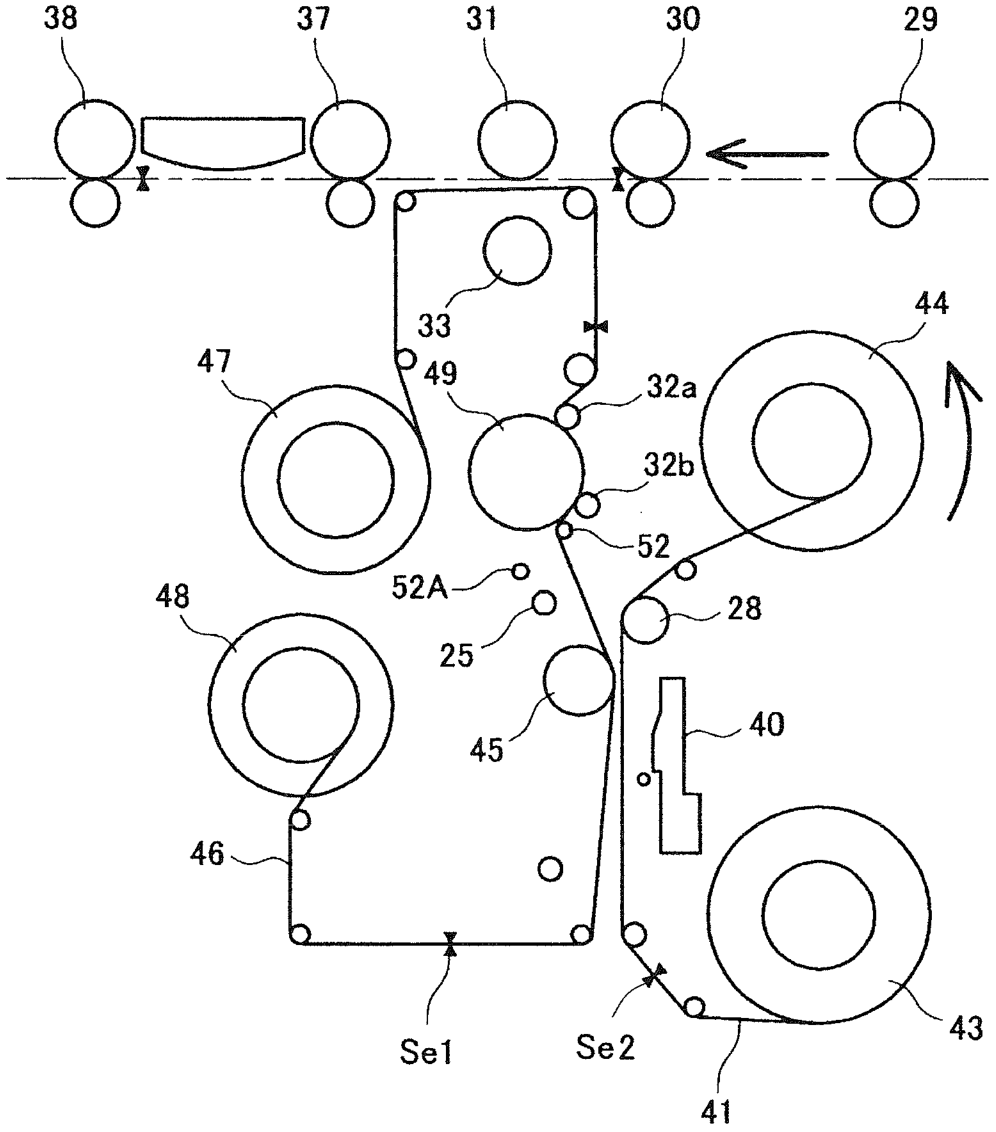
FIG. 8 is an operation explanatory view to explain the state of the printing position in the printing apparatus.

Next, when the cam 53 and cam 53A are further rotated in conjunction with each other and are in the state as shown in FIG. 5, the printing section B shifts to a transport position as shown in FIG. 8, and the platen roller 45 returns to the direction of retracting from the thermal head 40. In this state, the pinch rollers 32*a*, 32*b* still wind the transfer film 46 around the film transport roller 49, the tension receiving member 52 is in contact with the transfer film 46, and the transfer film 46 is transported backward to an initial position by rotation in the backward direction of the film transport roller 49. Also at this point, the shift amount of the transfer film 46 is controlled by rotation of the film transport roller 49, and the transfer film 46 is transported backward corresponding to the length in the transport direction of the printing region subjected to printing. In addition, the ink ribbon 41 is also rewound a predetermined amount with the motor Mr3, and the ink panel of the ink to print next waits in the initial position (feeding position).

Then, the control state by the cam 53 and cam 53A becomes the state as shown in FIG. 4 again and the printing position as shown in FIG. 7, the platen roller 45 is brought into press-contact with the thermal head 40, the film transport roller 49 rotates in the forward direction again to shift the transfer film 46 corresponding to the length of the printing region, and printing with the ink of the next ink panel is performed with the thermal head 40.

Thus, the operation in the printing position and transport position is repeated until printing with ink of all or predetermined ink panel is finished. Then, when printing with the thermal head 40 is finished, the image-formed region of the transfer film 46 is transported to the heat roller 33, and at this point, the cam 53 and cam 53A shift to the state as shown in FIG. 3, and release press-contact with the transfer film 46. Subsequently, transfer to the card Ca is performed while transporting the transfer film 46 by driving of the wind-up spool 47.

Such a printing section B is divided into three units 90, 91, and 92.

As shown in FIG. 9, in the first unit 90, a unit frame body 75 is installed with a drive shaft 70 that rotates by driving of the motor 54 (see FIG. 10), and the drive shaft 70 is inserted in the film transport roller 49. Below the film transfer film 49 are disposed the bracket 50A and a pair of platen support members 72, and these members are supported rotatably by the shaft 71 laid between opposite side plates of the unit frame body 75.

In FIG. 9, a pair of cam receiver support portions 85 that are a part of the bracket 50A appear from the bore portions 72*a*, 72*b* formed in the platen support members 72. The cam receiver support portions 85 hold a pair of cam receivers 84 disposed at the back thereof. Then, at the back of the cam receivers 84 is disposed the cam 53A installed in the cam shaft 83 inserted in the unit frame body 75. The camshaft 83 is laid between opposite side plates of the unit frame body 75.

Figure 11:
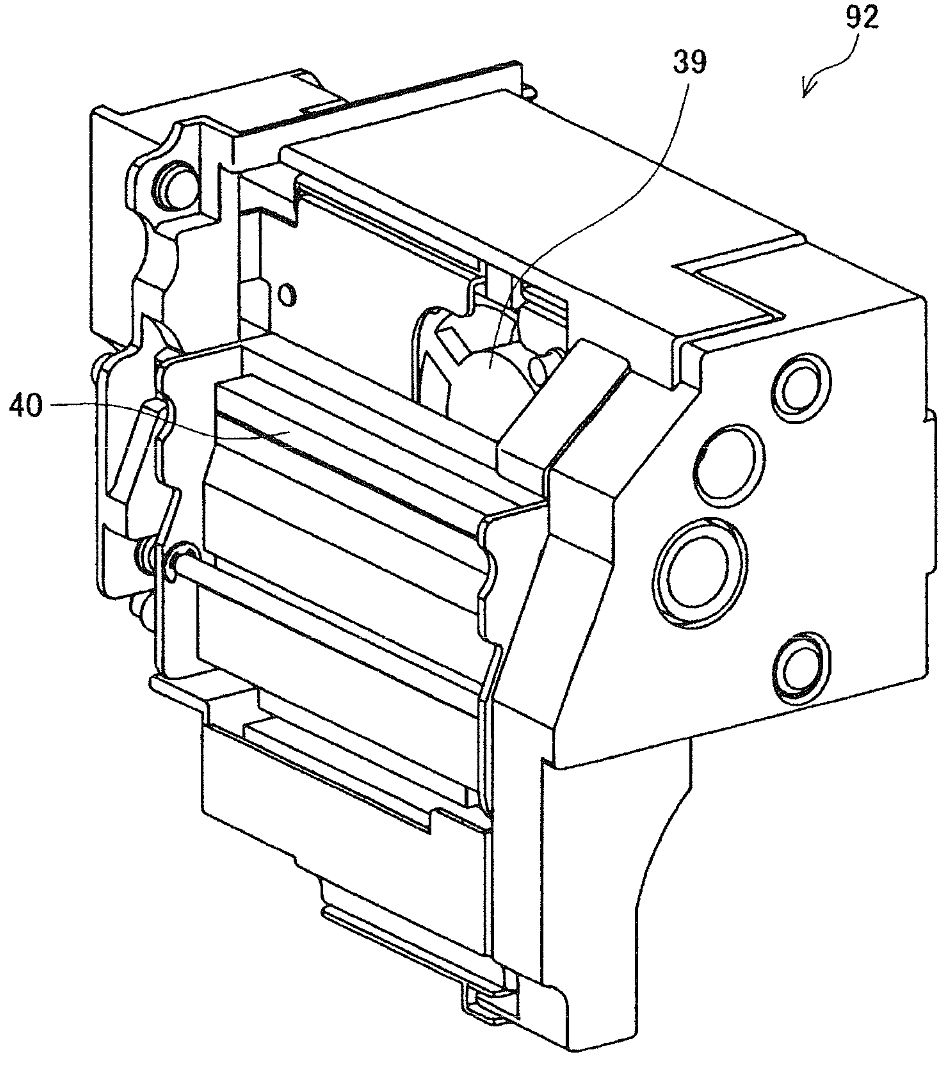
FIG. 11 is an outside view of a third unit integrated to incorporate the thermal head into the printing apparatus.

The above-mentioned thermal head 40 is disposed in the position opposed to the platen roller 45 with a transport path of the transfer film 46 and ink ribbon 41 therebetween. The thermal head 40, members related to heating and cooling fan 39 are integrated into the third unit 92 as shown in FIG. 11, and are disposed opposite the first unit 90.

The first unit 90 collectively holds the platen roller 45, peeling roller 25 and tension receiving member 52A varying in position by printing operation in the movable bracket 50A, and thereby eliminates the need of position adjustments among the members. Moreover, by shifting the bracket 50A by rotation of the cam 53, it is possible to shift the members to predetermined positions. Further, since the bracket 50A is provided, it is possible to store in the same unit as that of the fixed film transport roller 49, the transport drive portion by the film transport roller 49 required to transport the transfer film with accuracy and the transfer position regulation portion by the platen roller 45 are included in the same unit, and therefore, the need is eliminated for position adjustments between both portions.

As shown in FIG. 10, in the second unit 91, the cam shaft 82 installed with the cam 53 is inserted in a unit frame body 55, and is coupled to an output shaft of the drive motor 54. Then, the second unit 91 supports the bracket 50 in the unit frame body 55 movably to come into contact with the cam 53, and to the bracket 50 are fixed the support shaft 58 that supports the pinch roller support member 57 rotatably and the tension receiving member 52.

In the pinch roller support member 57, the spring members 51*a*, 51*b* are attached to the support shaft 58, and their end portions are respectively brought into contact with the opposite ends of the pinch roller support member 57 that supports the pinch rollers 32*a*, 32*b* to bias to the direction of the film transport roller 49. In the pinch roller support member 57, the support shaft 58 is inserted in the long holes 76, 77, and is fixed and supported in the center portion by the bracket 50.

A spring 89 for biasing the pinch roller support member 57 toward the bracket 50 is provided between the bracket 50 and the pinch roller support member 57. By this spring 89, the pinch roller support member 57 is biased in the direction of moving backward from the film transport roller 49 of the first unit 90, and therefore, it is possible to easily pass the transfer film 46 through between the first unit 90 and the second unit 91 in setting the transfer film cassette in the printing apparatus 1.

The second unit 91 holds the pinch rollers 32*a*, 32*b*, and tension receiving member 52 varying in position corresponding to printing operation in the bracket 50A, shifts the pinch rollers 32*a*, 32*b* and tension receiving member 52 by shifting the bracket 50A by rotation of the cam 53, and thereby simplifies position adjustments between the rollers and member, and position adjustments between the pinch rollers 32*a*, 32*b* and the film transport roller 49. Such a second unit 91 is disposed opposite the first unit 90 with the transfer film 46 therebetween.

By thus making the units, it is also possible to pull each of the first unit 90, second unit 92 and third unit 93 out of the main body of the printing apparatus 1 as in the cassette of each of the transfer film 46 and ink ribbon 41. Accordingly, in replacing the cassette due to consumption of the transfer film 46 or ink ribbon 41, when the units 90, 91 and 92 are pulled out as required, it is possible to install the transfer film 46 or ink ribbon 41 readily inside the apparatus in inserting the cassette.

As described above, by combining the first unit 90 into which are integrated the platen roller 45, bracket 50A, cam 53A, and platen support member 72, and the second unit 91 into which are integrated the pinch rollers 32*a*, 32*b*, bracket 50, cam 53 and spring members 51, and placing and installing the third unit 92 with the thermal head 40 attached thereto opposite the platen roller 45, it is possible to perform assembly in manufacturing the printing apparatus and adjustments in maintenance with ease and accuracy. Moreover, by integrating, it is possible to perform removal from the apparatus with ease, and the handleability as the printing apparatus is improved.

Described next is control and electric system of the printing apparatus 1. As shown in FIG. 12, the printing apparatus 1 has a control section 100 that performs operation control of the entire printing apparatus 1, and a power supply section 120 that transforms utility AC power supply into DC power supply that enables each mechanism section, control section and the like to be driven and actuated.

<Control Section>

As shown in FIG. 12, the control section 100 is provided with a microcomputer 102 that performs entire control processing of the printing apparatus 1. The microcomputer 102 is comprised of a CPU that operates at fast clock as the central processing unit, ROM in which is stored basic control operation (programs and program data) of the printing apparatus 1, RAM that works as a work area of the CPU, and internal buses that connect the components.

The microcomputer 102 is connected to an external bus. The external bus is connected to an interface, not shown, to communicate with the higher apparatus 201, and buffer memory 101 to temporarily store printing data to print on the card Ca, recording data to magnetically or electrically record in a magnetic stripe or stored IC of the card Ca, and the like.

Further, the external bus is connected to a sensor control section 103 that controls signals from various sensors, an actuator control section 104 that controls motor drivers and the like for outputting drive pulses and drive power to respective motors, a thermal head control section 105 to control thermal energy to heating elements constituting the thermal head 40, an operation display control section 106 to control the operation panel section 5, and the above-mentioned information recording section A.

(Power Supply Section)

The power supply section 120 supplies operation/drive power to the control section 100, thermal head 40, heat roller 33, operation panel section 5, information recording section A and the like.

<Characteristics and Others of the Printing Apparatus 1>

Described next are features of the printing apparatus 1 of this Embodiment.

Figure 13B:
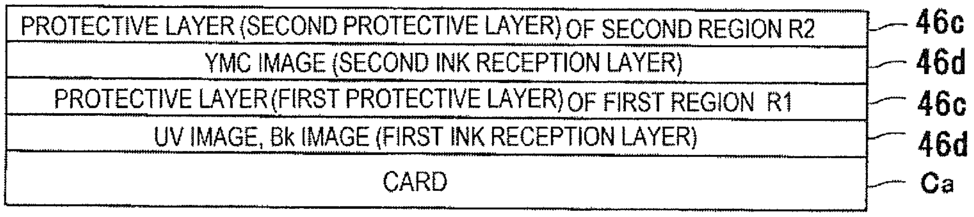

In order to enhance wear resistance and security properties, one feature of the printing apparatus 1 of this Embodiment is that the image formation section B1 forms a UV image in the ink reception layer 46*d* of the first region R1 of the transfer film 46, and further forms a YMC image in the ink reception layer 46*d* of the second region R2 of the transfer film 46 as shown in FIG. 13A, and that the transfer section B2 transfers the ink reception layer 46*d* of the first region R1 with the UV image formed and the protective layer 46*c* of the first region R1 of the transfer film 46 integrally in this order to the card Ca, and further transfers the ink reception layer 46*d* of the second region R2 with the YMC image formed and the protective layer 46*c* of the second region R2 integrally in this order to the transferred layer as shown in FIG. 13B.

Further, in order to ensure flatness on the surface side of the card Ca, another feature of the printing apparatus 1 of this Embodiment is that the image formation section B1 forms a Bk image in the ink reception layer 46*d* of the first region R1 of the transfer film 46 together as shown in FIG. 13A, and that the transfer section B2 transfers the UV image and Bk image formed in the first region R1 of the transfer film 46 to the card Ca. In addition, since the printing apparatus 1 of this Embodiment is an intermediate transfer type printer using the transfer film 46, in forming the images in the first region R1 of the transfer film 46, by printing in the order of UV and Bk, the UV image is not hidden behind the Bk image of fusible ink in retransferring the first region R1 to the card Ca.

Furthermore, as still another feature of the printing apparatus 1 of this Embodiment, in transferring as described, since a portion of the UV image overlapping a portion of the YMC image of printing data with a high gray-scale value is hard to view in visualizing the UV image by applying the visualization light beam, the still another feature is to determine printing energy of each of pixels constituting printing data of the UV image (hereinafter, referred to as UV printing data) corresponding to a gray-scale value of a pixel of printing data of the YMC image (hereinafter, referred to as YMC printing data) that corresponds to the position overlapping the pixel constituting the UV printing data and gray-scale values of peripheral pixels adjacent to the pixel, so that the concentration is constant when the UV image is visualized by the visualization light beam.

(Operation)

Card issue operation by the printing apparatus 1 according to this Embodiment will be described next with particular emphasis on the CPU of the microcomputer 102. In addition, the entire operation of the printing apparatus 1 is already described, and therefore, the card issue operation related to the above-mentioned features of the printing apparatus 1 will mainly be described herein.

First, in order to make it easy to grasp the content of the card issue operation of the printing apparatus 1, a desired layout to print on the card Ca will be described.

Figure 15A:
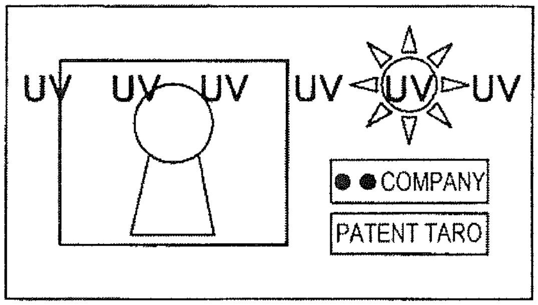
FIGS. 15A to 15C contain explanatory views schematically illustrating layouts of a UV image, Bk image and YMC image on the card, where
Figure 15B:
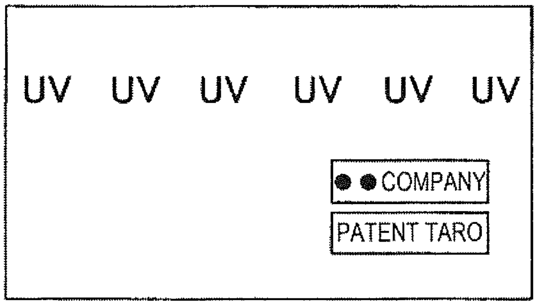
Figure 15C:
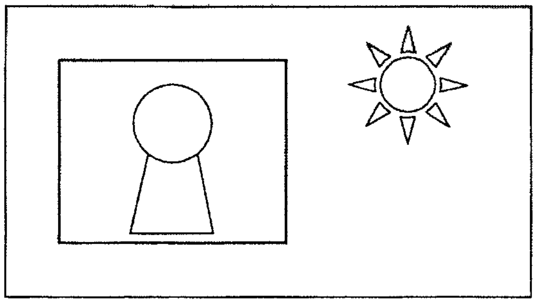

FIGS. 15A, 15B and 15C schematically show layouts of the UV image, Bk image and YMC image on the card Ca, FIG. 15A illustrates a desired layout, FIG. 15B illustrates a layout of the UV image and Bk image, and FIG. 15C illustrates a layout of the YMC image. In other words, the desired layout of FIG. 15A is obtained by superimposing the layout of the UV image and Bk image of FIG. 15B, and the layout of the YMC image of FIG. 15C.

The higher apparatus 201 side generates these UV image, Bk image and YMC image with application software. In generating, the UV image and Bk image are monochrome images of 256-level gray scale, and the YMC image is a color image (RGB image) of 256-level gray scale. An operator generates three kinds of images including the monochrome images for UV and Bk and RGB image for YMC with the application software, and color component image data of R, G, B is generated from the RGB image by the application software.

Further, the operator inputs magnetic or electric recording data to record on the card Ca on the higher apparatus 201 side, using the same application software as described above or another application software. Then, the higher apparatus 201 outputs these items of data to the printing apparatus 1.

The CPU (hereinafter, simply referred to as CPU) of the microcomputer 102 receives the image data (image data of UV, image data of Bk and color component image data of R, G, B) for one surface (for example, frontside) and the other side (for example, backside) and the magnetic or electric recording data from the higher apparatus 201 to store in the buffer memory 101. Next, the CPU determines whether or not to receive a printing start command, and in a negative determination, waits for the printing start command to be received, while in a positive determination, executing a card issue routine as shown in FIG. 16.

Figure 16:
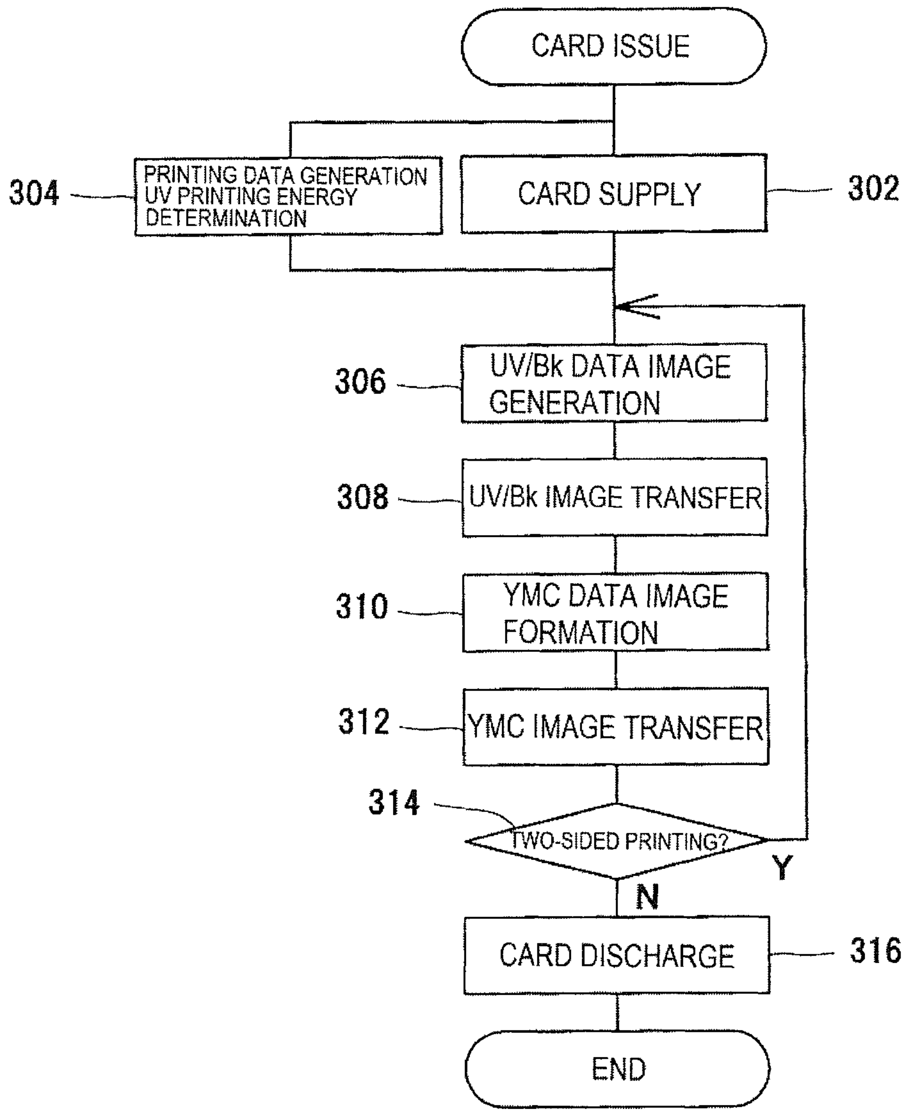
FIG. 16 is a flowchart of a card issue routine executed by a CPU of a microcomputer of the control section in the printing apparatus of this Embodiment.

As shown in FIG. 16, in the card issue routine, in step 302, the card Ca is fed out of the media storage section C, and based on the magnetic or electric recording data, the CPU performs recording processing on the card Ca in one of the magnetic recording section 24, non-contact type IC recording section 23, and contact type IC recording section 27 constituting the information recording section A, and then, transports the card Ca to the transfer section B2.

Figure 17:
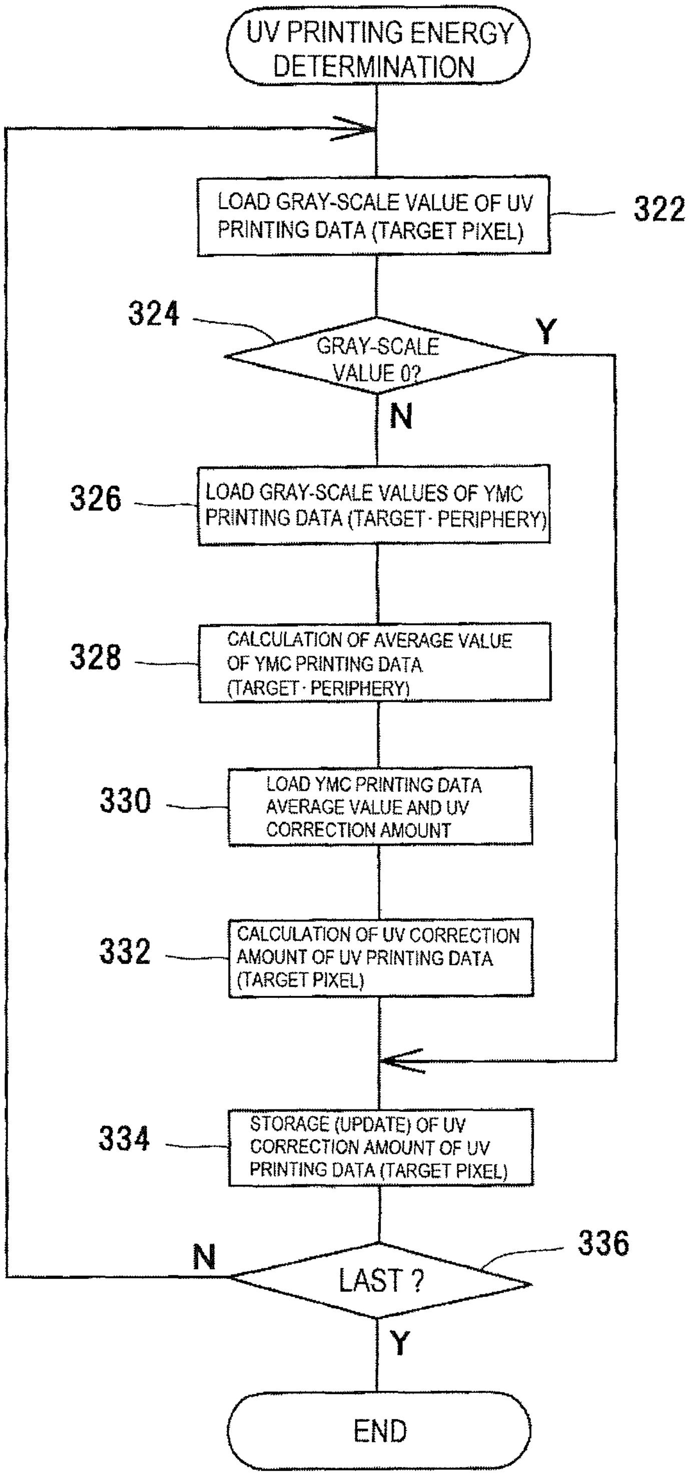
FIG. 17 is a flowchart of a UV printing energy determination routine executed by the CPU of the microcomputer of the control section.

In parallel with the processing in step 302, in step 304 the CPU performs printing data generation processing and UV printing energy determination processing. In other words, in the printing data generation processing, the CPU converts the color component image data of R, G, B for one surface and the other surface into printing data of Y, M C, respectively. Further, the printing apparatus 1 similarly uses the image data of UV and Bk for one surface and the other surface received from the higher apparatus 201 as the printing data of UV and Bk. As described above, since it is necessary to determine printing energy for the UV printing data, as shown in FIG. 17, the CPU executes a UV printing energy determination routine to determine the UV printing energy for the UV printing data with the thermal head 40. In addition, the UV printing energy determination routine is executed by the CPU as a part of subroutine of step 304 of the card issue routine.

As shown in FIG. 15A, in the desired layout, there are portions in which the UV image and YMC image overlap one another. As shown in FIG. 13A, since the UV image is transferred under the YMC image, in applying the visualization light beam, the UV image in the portion in which the UV image overlaps the YMC image is harder to see than that in the portion in which the images do not overlap one another. The UV printing energy determination routine is to correct the tendency to be hard to see, while determining the UV printing energy so that the concentration of the entire UV image is constant (to eliminate fluctuations in the concentration so as make the entire image easy to see). In this case, although it is also conceivable to correct the YMC printing data, when the YMC printing data is corrected, there is the risk that the image quality of the printed YMC image deteriorates. Therefore, in this Embodiment, the printing energy with respect to the gray-scale value of the pixel constituting the UV printing data is determined to be larger than the printing energy with respect to the gray-scale value of the pixel constituting the UV printing data that is an original.

Figure 18A:
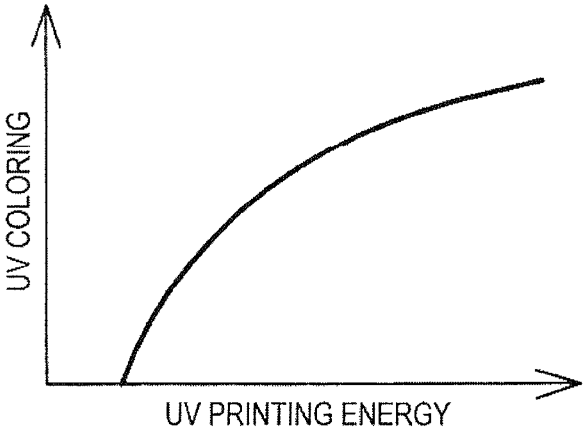
FIGS. 18A to 18C contain explanatory views illustrating the relationship between UV printing data and YMC printing data, where
Figure 18B:
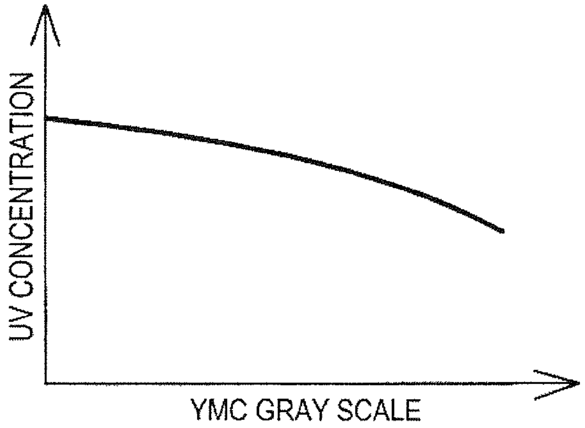
Figure 18C:
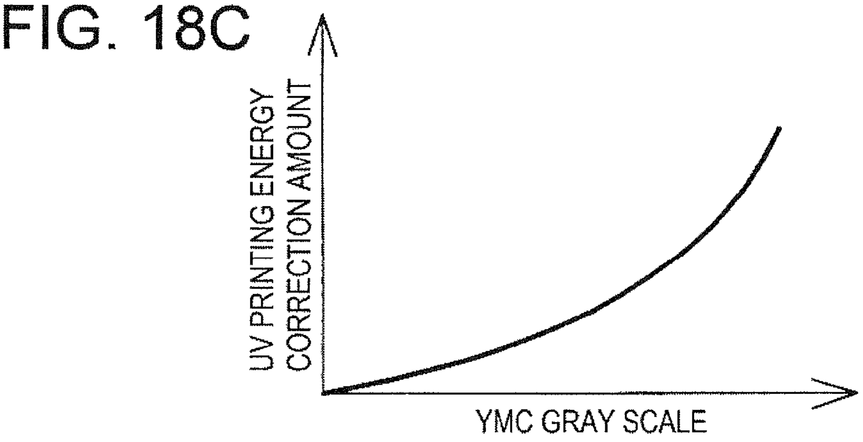

FIG. 18A illustrates the relationship between the printing energy for the UV printing data and coloring of the UV printing data. In the case where the pixel of the UV printing data does not overlap the pixel of the YMC printing data, or the case where the gray-scale value of the pixel of the UV printing data is "0" or close to "0" (for example, in the case where the gray-scale value is "10" or less, hereinafter, such a case is simply referred to as that the gray-scale value is "0" including the case where the gray-scale value is closer to "0"), it is not necessary to correct the printing energy for the pixel of the UV printing data, and according to the relationship as shown in FIG. 18A, it is only required to output the UV printing data to the thermal head control section 105. On the other hand, FIG. 18B illustrates that the concentration of the UV image degrades by irradiation of the visualization light beam, as the gray-scale value of the YMC data increases, in the case where the pixel of the UV printing data and the pixel of the YMC printing data overlap one another. Therefore, in order to make the concentration of the UV image constant, as shown in FIG. 18C, it is necessary to correct the printing energy for the pixel of the UV printing data, corresponding to the gray-scale value of the pixel of the YMC printing data that corresponds to the position overlapping the pixel of the UV printing data.

As shown in FIG. 17, in the UV printing energy determination routine, in step 322, the CPU reads the gray-scale value of the pixel (target pixel) of the UV printing data. Next, in step 324, the CPU determines whether or not the gray-scale value read in step 322 is "0". When the gray-scale value is "0", since the correction of the printing data is not necessary, the CPU proceeds to step 334. When the gray-scale value is not "0", since the correction of the printing data is necessary, the CPU proceeds to step 326.

Figure 19:
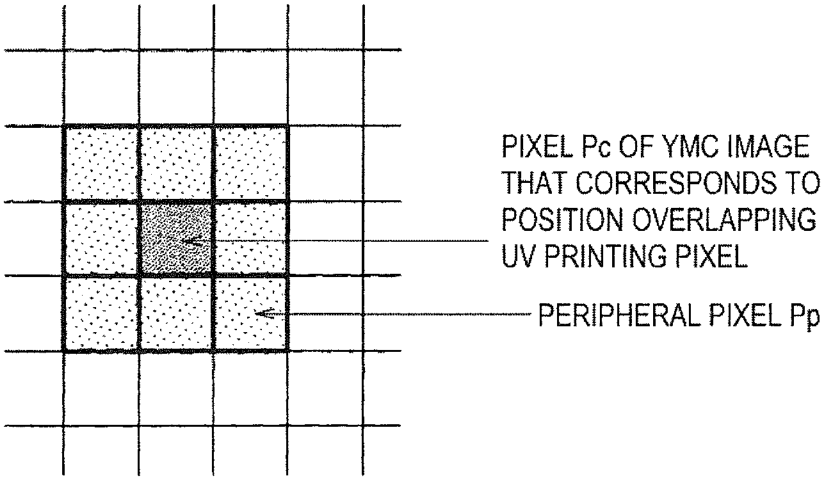
FIG. 19 is an explanatory view schematically illustrating a pixel of the YMC printing data that corresponds to a position overlapping a pixel of the UV printing data and its peripheral pixels.

In step 326, as shown in FIG. 19, the CPU reads the gray-scale values of the pixel Pc of the YMC printing data that corresponds to the position overlapping the target pixel and eight peripheral pixels Pp adjacent to this pixel Pc. The reason for thus reading also the gray-scale values of peripheral pixels Pp adjacent to the pixel Pc of the YMC printing data that corresponds to the position overlapping the target pixel is to consider a pixel deviation of the pixel Pc from the target pixel and the effects on the target pixel by the peripheral pixels Pp in irradiating the card with the invisible light beam obliquely.

In next step 328, the CPU calculates an average value of gray-scale values of the pixel Pc of the YMC printing data and eight peripheral pixels Pp adjacent to the pixel Pc. The pixel Pc and peripheral pixels Pp are comprised of pixels of printing data of Y, M, C, respectively. Therefore, the CPU first calculates the gray-scale values of the pixel Pc and peripheral pixels Pp. It is possible to obtain such calculation of gray-scale values, for example, by performing beforehand determined weighting for each of gray-scale values of pixels of the printing data of Y, M, C to add. In other words, since the effect (change in the concentration in applying the invisible light beam) of pixels constituting the YMC printing data on pixels constituting the UV printing data is varied with the mix ratio of YMC, large weights are assigned to gray-scale values of pixels of the printing data of Y, M, C with significant effects. For such calculation, for example, in the same manner as in the lookup table used in general color conversion, such a form may be used that weighting is beforehand made numerical with respect to the three-dimensional arrangement of the gray-scale value (256-level gray scale) of each of pixels of the printing data of Y, M, C.

Accordingly, in this Embodiment, the printing energy of each of pixels constituting the UV printing data is determined, corresponding to the gray-scale value of the pixel Pc of each of the printing data of Y, M, C of the YMC image that corresponds to the position overlapping the pixel constituting the UV printing data and the gray-scale values of the peripheral pixels Pp adjacent to the pixel Pc of the printing data of Y, M, C, respectively.

Next, in step 330, as shown in FIG. 18C, the CPU reads a table showing the relationship between the gray-scale value of the YMC printing data and the UV printing energy correction amount, and in next step 332, applies the gray-scale value of the YMC printing data calculated in step 328 to the table to calculate the energy correction amount of the pixel of the UV printing data. In next step 324, the CPU stores the correction amount calculated in step 332 in the RAM.

Next, in step 336, the CPU determines whether or not the target pixel is the last pixel to constitute the UV printing data, and in a negative determination, returns to step 322 to perform the same processing as described above on the next target pixel, while in a positive determination, finishing the UV printing energy determination routine to proceed to step 306 in FIG. 16.

In step 306, as shown in FIG. 13A, the image formation section B1 forms the UV image in the ink reception layer 46*d* of the first region R1 of the transfer film 46, and next, forms the Bk image in the ink reception layer 46*d* of the first region R1 of the transfer film 46. In forming the UV image, the CPU transmits the printing data of the UV printing data together with the correction amount stored in step 334 in FIG. 17 to the thermal head control section 105, the thermal head control section 105 controls the thermal head 40 based on the amount and data, and the UV image is thereby formed in the ink reception layer 46*d* of the first region R1 of the transfer film 46. In addition, the CPU does not calculate a correction amount such as the amount for the UV printing data on the Bk printing data and YMC printing data described later, and transmits the Bk printing data and YMC printing data (printing data of each of Y, M, C) to the thermal head control section 105.

Figure 14B:
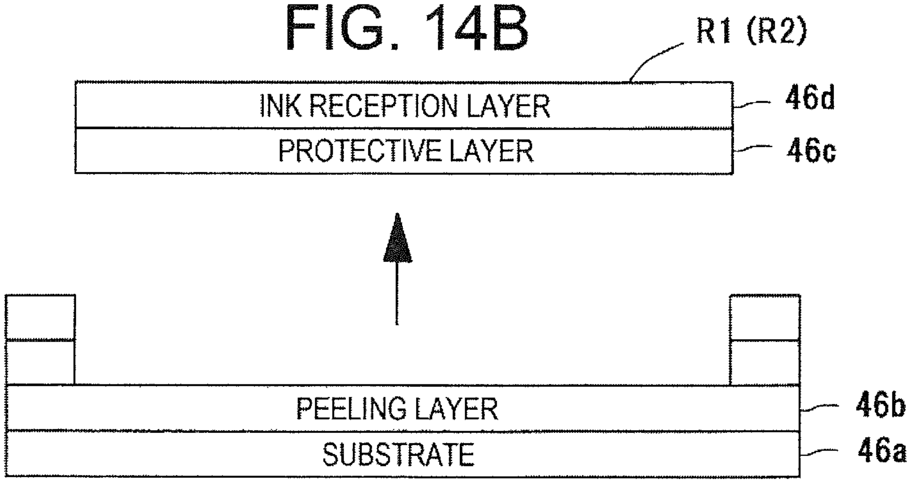

In next step 308, as shown in FIG. 14B, the transfer section B2 transfers the ink reception layer 46*d* of the first region R1 with the UV image formed and the protective layer 46*c* of the first region R1 of the transfer film 46 integrally in this order to the card Ca. By this means, as shown in FIG. 13B, on the card Ca are stacked the ink reception layer 46*d* (hereinafter, referred to as the first ink reception layer 46*d* (R1) including the origin of the region of the transfer film 46) of the first region R1 with the UV image and Bk image formed and the protective layer 46*c* (hereinafter, referred to as first protective layer 46*c* (R1) including the origin of the region of the transfer film 46).

Next, in step 310, as shown in FIG. 13A, the image formation section B1 forms the YMC image in the order of Y, M, C in the ink reception layer 46*d* of the second region R2 of the transfer film 46. Next, in step 312, as shown in FIG. 14B, the transfer section B2 transfers the ink reception layer 46*d* of the second region R2 with the YMC image formed and the protective layer 46*c* of the second region R2 integrally in this order onto the protective layer 46*c* of the first region R1 transferred to the card Ca in step 308. By this means, as shown in FIG. 13B, on the card Ca are stacked four layers i.e. the first ink reception layer 46*d* (R1), the first protective layer 46*c* (R1), the ink reception layer 46*d* (hereinafter, referred to as second ink reception layer 46*d* (R2) including the origin of the region of the transfer film 46) of the second region R2 with the YMC image formed, and the protective layer 46*d* (hereinafter, referred to as second ink protective layer 46*c* (R2) including the Origin of the region of the transfer film 46) of the second region R2.

In next step 314, the CPU determines whether or not printing is two-sided printing on the card Ca, and in a positive determination, returns to step 306 to similarly print on the other surface. In a negative determination, the CPU corrects curl of the card Ca occurring by thermal transfer by the heat roller 33 with the decurl mechanism 36, then discharges the card Ca toward the storage stocker 60, and finishes the card issue routine.

<Effects and Others>

The effects and others of the printing apparatus 1 of this Embodiment will be described next.

In the printing apparatus 1 of this Embodiment, the image formation section B1 forms a UV image in the ink reception layer 46*d* of the first region R1 of the transfer film 46, and further forms a YMC image in ink reception layer 46*d* of the second region R2 of the transfer film 46, and the transfer section B2 transfers the ink reception layer 46*d* of the first region R1 with the UV image formed and the protective layer 46*c* of the first region R1 of the transfer film 46 integrally in this order to the card Ca, and further transfers the ink reception layer 46*d* of the second region R2 with the YMC image formed and the protective layer 46*c* of the second region R2 integrally in this order onto the transferred layer. As shown in FIG. 13B, on thus generated (issued) card are stacked four layers of the first ink reception layer 46*d* (R1), first protective layer 46*c* (R1), second reception layer 46*d* (R2) and second protective layer 46*c* (R2) in this order.

Herein, in comparing the card (see FIG. 13B, hereinafter, referred to as card of this Embodiment) generated in the printing apparatus 1 of this Embodiment with the card (Patent Document 1, see FIG. 3, hereinafter referred to as card of Patent Document 1) by the invention of Patent Document 1, the cards are common in the respect that both of the cards are four-layer structure and have two protective layers, and in the card of Patent Document 1, the YMC image is arranged on the inner side, while the UV image is arranged on the outer side. In contrast thereto, in the card of this Embodiment, the UV image is arranged on the inner side, while the YMC image is arranged on the outer side. In the card of Patent Document 1, since the UV image is arranged on the outer side, when wear occurs on the card surface, the UV image is first lost. Since the UV image is used mainly in security, when a part of the data constituting the UV image is lost, there is the risk that normal determination of security is impaired. In contrast thereto, in the card of this Embodiment, since the UV image is arranged on the inner side and the YMC image is arranged on the outer side, even when wear occurs on the card surface, the UV image is not lost, and the YMC image such as a photograph of face of the card owner, and mark or logo of the company to which the card owner belongs is only partially lost, and does not lose the functionality by partial loss.

Further, in the card of Patent Document 1, since the UV image and Bk image are formed with thermofusible ink, the asperities on the card surface are promoted to tend to wear. In contrast thereto, in the card of this Embodiment, the UV image is formed with thermal sublimation ink, the Bk image is formed with thermofusible ink, the thermofusible ink is used in Bk ink as in the card of Patent Document 1, asperities of the Bk image with the thermofusible ink are absorbed by the YMC image and protective layer arranged on the outer side, the surface of the card is made almost flat, the card surface is hard to wear, and durability is improved.

Furthermore, in the card of this Embodiment, since the UV image is arranged on the inner side, the data constituting the UV image is not lost, the determination on security is ensured, and it is possible to enhance resistance to forgery of the UV image used in security.

Still furthermore, in the card of this Embodiment, the Bk image is formed in the first ink reception layer 46*d* (R1) together with the UV image. The card of Patent Document 1 shows the example where the Bk image is formed in the ink reception layer with the YMC image formed (see FIG. 3), but in such an example, asperities on the card surface are not eased. In this respect, as in the card of this Embodiment, when the Bk image is formed together in the first ink reception layer 46*d* (R1), since the asperities of the first ink reception layer 46*d* (R1) are absorbed by the second ink reception layer 46*d* (R2) and second protective layer 46*c* (R2) arranged on the outer side, it is possible to make the card surface almost flat even though the card has the Bk image.

Moreover, in the printing apparatus 1 of this Embodiment, as shown in FIG. 19, the printing energy of each of pixels constituting the UV printing data is determined (corrected) corresponding to gray-scale values of the pixel Pc of the YMC printing data that corresponds to a position overlapping the pixel constituting the UV printing data and pixels Pp adjacent to the pixel Pc so that the concentration is constant when the UV image is visualized by irradiation of the visualization light beam. Accordingly, even in adopting the four-layer structure as described above on the card Ca, it is possible to prevent the portion of the UV printing data overlapping the portion with a high gray-scale value of the YMC printing data from being hard to see in applying the visualization light beam to visualize the UV image, and it is also possible to prevent the occurrence of concentration fluctuations of the entire UV image. In addition, only in consideration of the purpose for preventing the occurrence of concentration fluctuations of the entire UV image, the gray-scale value of the UV printing data overlapping the portion with a low gray-scale value (including the gray-scale value of "0") of the YMC printing data may be determined (corrected) to be lower than the gray-scale value of the UV printing data overlapping the portion with a high gray-scale value of the YMC printing data. Further, it may be determined (corrected) that the gray-scale value of the UV printing data overlapping the portion with a low gray-scale value of the YMC printing data is lower than the original gray-scale value, and that the gray-scale value of the UV printing data overlapping the portion with a high gray-scale value of the YMC printing data is higher than the original gray-scale value.

In addition, this Embodiment exemplifies a UV image as the first image (invisible image) and a YMC image with ink of three colors as the second image, but the present invention is not limited thereto. For example, a UR (ultrared) image may be used as the first image, while using an image with thermal sublimation ink of one or more colors as the second image. Further, this Embodiment shows the example of forming the UV image with thermal sublimation ink, and the UV image may be formed with thermofusible ink. Also in this case, asperities of the UV image and Bk image with the thermofusible ink are absorbed by the YMC image and protective layer arranged on the outer side, the surface of the card is made almost flat, the card surface is hard to wear, and durability is improved.

Further, as the image formation/transfer procedure, this Embodiment shows the example in which the image formation section B1 forms the UV image and Bk image in the ink reception layer 46*d* of the first region R1 of the transfer film 46, the transfer section B2 transfers the ink reception layer 46*d* of the first region R1 with the UV image and Bk image formed and the protective layer 46*c* of the first region R1 of the transfer film 46 integrally in this order to the card Ca, subsequently the image formation section B1 forms the YMC image in the ink reception layer 46*d* of the second region R2 of the transfer film 46, and the transfer section B2 transfers the ink reception layer 46*d* of the second region R2 with the YMC image formed and the protective layer 46*c* of the second region R2 integrally in this order onto the protective layer 46*c* of the first region R1. However, the present invention is not limited thereto, and such a procedure may be adopted that the image formation section B1 forms the UV image and Bk image in the ink reception layer 46*d* of the first region R1 of the transfer film 46, and forms the YMC image in the ink reception layer 46*d* of the second region R2, and that subsequently the transfer section B2 transfers the ink reception layer 46*d* of the first region R1 with the UV image and Bk image formed and the protective layer 46*c* of the first region R1 of the transfer film 46, and transfers the ink reception layer 46*d* of the second region R2 with the YMC image formed and the protective layer 46*c* of the second region R2 thereonto.

Furthermore, in forming images in the ink reception layer 46*d* of the first region R1 of the transfer film 46, this Embodiment shows the example of forming in the order of the UV image and Bk image, and the images may be formed in the inverse order. Still furthermore, in order to enhance wear resistance of the card, as shown in Patent Document 2, a protective layer surface may be provided in the ink ribbon 41 to transfer the protective layer of the protective layer surface to the surface side of the card to cover.

Moreover, in discharging the card, this Embodiment shows the example of correcting curl of the card occurring by thermal transfer by the heat roller 33 with the decurl mechanism 36, and since the decurl mechanism 36 of this Embodiment has also the function of pressing the card surface (to promote flatness of the card surface) as well as the function of correcting the card, the curl of the card may be corrected with the decurl mechanism 36 between steps 308 and 310 of FIG. 16 (after transferring the first ink reception layer 46*d* (R1) and first protective layer 46*c* (R1) to the card).

Further, this Embodiment shows the example of determining the printing energy of each of pixels constituting the UV printing data corresponding to the gray-scale values of the pixel Pc of the YMC printing data that corresponds to the position overlapping the pixel constituting the UV printing data and peripheral pixels Pp adjacent to the pixel Pc (step 326), but the present invention is not limited thereto. The printing energy of each of pixels constituting the UV printing data may be determined corresponding to only the gray-scale value of the pixel Pc of the YMC printing data that corresponds to the position overlapping the pixel constituting the UV printing data, while ignoring the gray-scale values of the peripheral pixels Pp. Moreover, this Embodiment illustrates a single peripheral pixel of the pixel Pc as the peripheral pixel, but the present invention is not limited thereto, and the number of peripheral pixels may be made the peripheral pixels (for example, in addition to a pixel adjacent to the pixel Pc, another pixel further adjacent to this adjacent pixel may be made the peripheral pixel.)

Furthermore, this Embodiment shows the example of determining the printing energy of each of pixels constituting the UV printing data corresponding to an average value of gray-scale values of the pixel Pc of the YMC printing data that corresponds to the position overlapping the pixel constituting the UV printing data and peripheral pixels Pp adjacent to the pixel Pc (step 328), but the present invention is not limited thereto. For example, different weights may be assigned to the gray-scale value of the pixel Pc of the YMC printing data and gray-scale values of the peripheral pixels Pp adjacent to the pixel Pc. In this case, a larger weighting coefficient may be assigned to the gray-scale value of the pixel Pc having the significant effect on the pixel constituting the UV printing data than that of the peripheral pixels Pp.

Still furthermore, this Embodiment shows the example of determining the printing energy of each of pixels constituting the UV printing data corresponding to the gray-scale values of the pixel Pc of the YMC printing data that corresponds to the position overlapping the pixel constituting the UV printing data and peripheral pixels Pp adjacent to the pixel Pc (step 332), but the present invention is not limited thereto, and the gray-scale value of each of pixels constituting the UV printing data may be determined or corrected. In this case, in step 330, the CPU reads a table showing the relationship between the gray-scale value of the YMC printing data and a gray-scale value correction amount of the UV printing data, and in next step 332, applies the gray-scale value of the YMC printing data calculated in step 328 to the table to calculate the gray-scale value correction amount of the pixel of the UV printing data. In this case, the CPU may generate corrected UV printing data obtained by correcting the UV printing data according to the gray-scale value correction amount of the pixel of the UV printing data. At this point, as in the case of the printing energy as described in the Embodiment, it is preferable that the gray-scale value of the pixel constituting the UV printing data is determined (corrected) to be larger than the gray-scale value of the pixel constituting the UV printing data that is an original.

Moreover, this Embodiment exemplifies 256-level gray scale for the UV printing data, Bk printing data and YMC printing data, but the present invention is not limited thereto, and for example, 64-level gray scale or the like may be used.

Further, this Embodiment shows the example where the UV printing energy determination is made on the printing apparatus 1 side, but present invention is not limited thereto, and the UV printing energy determination may be made on the higher apparatus 201 side. Moreover, the higher apparatus 201 side may calculate a correction value of gray scale of each of pixels of the UV printing data so that the concentration is constant when the UV image is visualized by irradiation of the visualization light beam, or generate new UV printing data with the calculated correction value to output to the printing apparatus 1 side.

In addition, this application claims priority from Japanese Patent Application No. 2014-079539 incorporated herein by reference.

The invention claimed is:

1. A printing apparatus that forms an image on an intermediate transfer medium to transfer the image to a printing medium, comprising:

an image formation section that forms an invisible first image, which is visualized by applying a visualization light beam, in a first region of the intermediate transfer medium and that forms a visible second image with sublimation ink in a second region different from the first region;

a transfer section that transfers the first image formed in the first region to the printing medium and that transfers the second image formed in the second region onto the first image; and a control section for controlling the image formation section and the transfer section, wherein the control section controls the image formation section to form the first image in the first region of the intermediate transfer medium, and to form the second image in the second region different from the first region, and thereafter, the control section controls the transfer section to transfer the first image formed in the first region to the printing medium, and subsequently to transfer the second image formed in the second region onto the first image.

2. The printing apparatus according to claim 1, wherein the intermediate transfer medium has a substrate, and a protective layer and an ink reception layer on the substrate, the image formation section forms a UV image or a UR image in the ink reception layer in the first region, and forms an YMC image in the ink reception layer in the second region, and the transfer section transfers the ink reception layer in the first region formed with the UV image or the UR image and the protective layer in the first region integrally in this order to the printing medium, and transfers the ink reception layer in the second region formed with the YMC image and the protective layer in the second region integrally in this order thereonto.

3. The printing apparatus according to claim 1, further comprising:

a determination section that determines a gray-scale value or printing energy of each of pixels constituting printing data of the first image, corresponding to a gray-scale value of a pixel or of the pixel and a peripheral pixel around the pixel of printing data of the second image that corresponds to a position overlapping another pixel constituting printing data of the first image, wherein the determination section determines the gray-scale value or printing energy of each of pixels constituting printing data of the first image when the gray-scale value is high in the pixel of printing data of the second image or in the pixel and the peripheral pixel around the pixel to be higher than the gray-scale value or printing energy of each of pixels constituting printing data of the first image when the gray-scale value of the pixel or of the pixel and the peripheral pixel around the pixel of printing data of the second image is lower than a predetermined gray-scale value, and the image formation section forms the first image in the first region according to the gray-scale value or printing energy of each of pixels constituting printing data of the first image determined in the determination section.

4. The printing apparatus according to claim 1, wherein the intermediate transfer medium has a substrate; a first ink reception layer formed on the substrate, and a first protective layer formed on the first ink reception layer; and a second ink reception layer formed on the substrate, and a second protective layer formed on the second ink reception layer, and when the first and second ink reception layers and the first and second protective layers are transferred onto the printing medium, the first ink reception layer, the first protective layer, the second ink reception layer and the second protective layer are formed on the printing medium in this order so that the first ink reception layer in the first region is protected from damage and wear by the first ink protective layer, the second ink reception layer and the second protective layer.

5. The printing apparatus according to claim 1, wherein the image formation section forms a third image with fusible ink together in the first region, and the transfer section transfers the first image and the third image formed in the first region to the printing medium.

6. The printing apparatus according to claim 5, wherein the first image is formed with the sublimation ink, and the third image with the fusible ink is printed on the first image; and the transfer section transfers the third image and the first image integrally in order to the printing medium.

7. The printing apparatus according to claim 1, further comprising:

a determination section that determines a gray-scale value or printing energy of each of pixels constituting printing data of the first image, corresponding to a gray-scale value of a pixel or of the pixel and a peripheral pixel around the pixel of printing data of the second image that corresponds to a position overlapping another pixel constituting printing data of the first image, so that a concentration is constant when the first image is visualized by irradiation of the visualization light beam, wherein the image formation section forms the first image in the first region according to the gray-scale value or printing energy of each of pixels constituting printing data of the first image determined in the determination section.

8. The printing apparatus according to claim 7, wherein the determination section determines the gray-scale value or printing energy of each of pixels constituting printing data of the first image, corresponding to a gray-scale value of each of pixels of a plurality of items of printing data of the second image that corresponds to the position overlapping the pixel constituting the printing data of the first image or corresponding to a gray-scale value of each of pixels of a plurality of items of printing data of the second image that corresponds to the position overlapping and gray-scale values of peripheral pixels around respective pixels of the plurality of items of printing data, so that the concentration is constant when the first image is visualized by irradiation of the visualization light beam.

9. The printing apparatus according to claim 7, wherein the determination section determines the gray-scale value of the pixel constituting printing data of the first image to be larger than the gray-scale value of the pixel constituting the printing data of the first image that is an original.

10. A printing system provided with the printing apparatus according to claim 1 and a host computer, wherein one of the printing apparatus and the host computer is provided with a determination section that determines a gray-scale value or printing energy of each of pixels constituting printing data of the first image, corresponding to a gray-scale value of a pixel or of the pixel and a peripheral pixel around the pixel of printing data of the second image that corresponds to a position overlapping another pixel constituting printing data of the first image, a peripheral pixel around the pixel, so that a concentration is constant when the first image is visualized by irradiation of the visualization light beam, and the image formation section forms the first image in the first region according to the gray-scale value or printing energy of each of pixels constituting printing data of the first image determined in the determination section.

11. The printing system according to claim 10, wherein one of the printing apparatus and the host computer is further provided with a correction section that corrects printing data of the first image based on the gray-scale value of each of pixels constituting printing data of the first image determined in the determination section, and the image formation section forms the first image in the first region according to the gray-scale value of each of pixels constituting printing data of the first image corrected in the correction section.

12. A printing apparatus that forms an image on an intermediate transfer medium to transfer the image to a printing medium, comprising:

an image formation section that forms an invisible first image, which is visualized by applying a visualization light beam, in a first region of the intermediate transfer medium and that forms a visible second image with sublimation ink in a second region different from the first region;

a transfer section that transfers the first image formed in the first region to the printing medium and that transfers the second image formed in the second region onto the first image; and a determination section that determines a gray-scale value or printing energy of each of pixels constituting printing data of the first image, corresponding to a gray-scale value of a pixel or of the pixel and a peripheral pixel around the pixel of printing data of the second image that corresponds to a position overlapping another pixel constituting printing data of the first image, so that a concentration is constant when the first image is visualized by irradiation of the visualization light beam, wherein the image formation section forms the first image in the first region according to the gray-scale value or printing energy of each of pixels constituting printing data of the first image determined in the determination section.

13. A printing apparatus that forms an image on an intermediate transfer medium to transfer the image to a printing medium, comprising:

an image formation section that forms an invisible first image, which is visualized by applying a visualization light beam, in a first region of the intermediate transfer medium and that forms a visible second image with sublimation ink in a second region different from the first region;

a transfer section that transfers the first image formed in the first region to the printing medium and that transfers the second image formed in the second region onto the first image; and a determination section that determines a gray-scale value or printing energy of each of pixels constituting printing data of the first image, corresponding to a gray-scale value of a pixel or of the pixel and a peripheral pixel around the pixel of printing data of the second image that corresponds to a position overlapping another pixel constituting printing data of the first image, wherein the determination section determines the gray-scale value or printing energy of each of pixels constituting printing data of the first image when the gray-scale value is high in the pixel of printing data of the second image or in the pixel and the peripheral pixel around the pixel to be higher than the gray-scale value or printing energy of each of pixels constituting printing data of the first image when the gray-scale value of the pixel or of the pixel and the peripheral pixel around the pixel of printing data of the second image is lower than a predetermined gray-scale value, and the image formation section forms the first image in the first region according to the gray-scale value or printing energy of each of pixels constituting printing data of the first image determined in the determination section.

* * * * *